United States Patent
Ou et al.

(10) Patent No.: US 8,044,783 B2
(45) Date of Patent: Oct. 25, 2011

(54) TIRE CONDITION DETECTION SYSTEM AND INDUCTION FEED METHOD THEREOF

(75) Inventors: Hok Huor Ou, Kanagawa (JP); Shiro Nagata, Saitama (JP); Eiichi Ishii, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 421 days.

(21) Appl. No.: 11/708,130

(22) Filed: Feb. 20, 2007

(65) Prior Publication Data

US 2007/0222570 A1  Sep. 27, 2007

(30) Foreign Application Priority Data

Feb. 28, 2006  (JP) ................................. 2006-054140

(51) Int. Cl.
  *B60C 23/00* (2006.01)
(52) U.S. Cl. ...................................... 340/447; 116/34 R
(58) Field of Classification Search .................. 340/447, 340/424.4, 438, 442, 445, 700, 787, 788; 343/700, 787, 788; 116/34 R, 34 A, 34 B
  See application file for complete search history.

(56) References Cited

U.S. PATENT DOCUMENTS

| | | | |
|---|---|---|---|
| 7,382,221 B2 * | 6/2008 | Morimoto et al. | 336/198 |
| 7,443,168 B2 * | 10/2008 | Gold et al. | 324/339 |
| 2002/0190853 A1 * | 12/2002 | Nigon et al. | 340/448 |
| 2003/0156067 A1 * | 8/2003 | Tenten | 343/711 |
| 2004/0027241 A1 * | 2/2004 | Forster | 340/445 |
| 2004/0201468 A1 * | 10/2004 | Zimmer | 340/448 |
| 2005/0163063 A1 * | 7/2005 | Kuchler et al. | 370/278 |
| 2005/0172708 A1 * | 8/2005 | Beckley et al. | 73/146 |
| 2006/0001534 A1 * | 1/2006 | Shida et al. | 340/445 |
| 2006/0137788 A1 * | 6/2006 | Myatt | 152/152.1 |
| 2006/0214866 A1 * | 9/2006 | Araki et al. | 343/788 |

FOREIGN PATENT DOCUMENTS

| | | |
|---|---|---|
| JP | 5-169931 A | 7/1993 |
| JP | 10-104103 | 4/1998 |
| JP | 2002-209343 A | 7/2002 |
| JP | 2003-237328 | 8/2003 |
| JP | 2003-291615 | 10/2003 |
| JP | 2004-161113 | 6/2004 |

* cited by examiner

*Primary Examiner* — Brian Zimmerman
*Assistant Examiner* — Sara Samson
(74) *Attorney, Agent, or Firm* — Rabin & Berdo, P.C.

(57) ABSTRACT

An external solenoid positioned external to a tire, and an internal solenoid provided inside a valve of the tire, which transmits and receives power by an alternating magnetic field in a predetermined high frequency band that generates an induced alternating current in the internal solenoid, is used as a new source of power for a tire pressure/temperature detection device instead of a battery. If the alternating magnetic field in a predetermined high frequency band is well matched to the physical structure and electrical structure of the tire, then, in the space between the tire and a wheel, an induced alternating magnetic field component is distributed that is substantially parallel to the axis of rotation of the tire. If the internal solenoid is matched to the direction of maximum magnetic field reception, when the tire rotates, and when the position of the wheel is stopped, substantially stable power may be received.

21 Claims, 15 Drawing Sheets

TIRE CONDITION DETECTION SYSTEM AND INDUCTION FEED METHOD THEREOF

BACKGROUND OF THE INVENTION

1. Field of the Invention

The present invention relates to a tire condition detection system with various sensors for determining the physical properties inside a tire, such as the air pressure, the temperature and the like, and an induction supply method for externally supplying the power necessary for the operation of the sensors via wires or mesh embedded in the tire rubber to increase the tire strength.

2. Description of the Related Art

Conventionally, the technology relating to tire condition detection systems is as described in, for example, the following documents.

Publication 1: Japanese Patent Application Laid-Open (JP-A) No. 10-104103

Publication 2: JP-A No. 2003-237328

Publication 3: JP-A No. 2003-291615

Publication 4: JP-A No. 2004-161113

In Publication 1 is disclosed technology of a tire pressure monitoring device including a central reception evaluation device placed in a vehicle, and used for a vehicle having plural wheels.

In Publication 2 and 4 is disclosed technology relating to a wireless tire condition monitoring device in which the tire internal air pressure and the like may be confirmed from within the cabin of a vehicle.

In Publication 3 is disclosed technology of a tire air pressure detection device that detects the condition of a tire, such as the air pressure, temperature and the like, and transmits the condition of the tire by wireless signal.

Generally, any antennas follow a so-called reversal theorem, i.e., transmission characteristics are exactly the same as reception characteristics, therefore in the following explanation, transmission will be explained, and, except for particular instances, since reception is the same, explanation thereof will be omitted.

Recently, with computers becoming ultra-small, and the possibility of the use of single chip computers has become a reality, there has been remarkable progress in the technical development of vehicles such as cars and the like. Various communications devices, engine control devices, driving safety devices for assisting the driving operation of a driver, and the like, that are provided in vehicles rely, in the main, on computers, and evolution in the performance/functionality of vehicles continues to develop. With the above, it seems that, apart from specialists, the general public do not seem to recognize the extremely important roll that the wheels perform in supporting and moving the vehicle body.

In the past, it was normal for vehicle wheels to be constructed of a wheel, a tube, and a tire. However, due to the development of tubeless tires, tubeless tires are used on nearly all vehicles, with the exception of heavy vehicles, and so car wheels are constructed of a wheel and a tubeless tire (referred to below as "tire" for simplicity). Since air tubes have disappeared, punctures are not the slow leaking of air as before, but a sudden splitting (bursting), and it is not rare that this leads to a serious traffic accident.

Also, there is a close relationship between tires and the engine mileage, and there is good fuel consumption efficiency when running with the optimum pressure, and it is well known that the distance that can be traveled using a given amount of fuel can be extended. The fact that someone will check your tires when refilling with gasoline at a gas station is for this reason.

Even if the value of the air pressure is optimal for normal driving, when driven for an extended period of time, at a high speed, the air within a tire moves intensely, and the tire also deforms while rotating, so generating a large amount of heat, that may raise the internal temperature of the tire to about 150° C. The result is that, whilst the air pressure within the tire should be at the optimum temperature, the air pressure is actually raised by such generated heat, and this may sometimes lead to the tire exploding.

Due to this, as described in the Publications 1 to 4, and the like, devices have been developed for detecting the air pressure and temperature of tires, and currently, it is obligatory to fit such devices to all new models of car in the United States.

FIGS. 3A and 3B are explanatory diagrams of a conventional tire condition detection system. FIG. 3A is an external view of a vehicle wheel structure and antenna system provided with a conventional tire condition detection system. FIG. 3B is a diagram showing the wheel cross section and reception antenna provided in a tire pressure/temperature detection device of the tire condition detection system of FIG. 3A.

As shown in FIG. 3A, the vehicle body is provided with a vehicle wheel rotating axel 1 for the front wheels, and a vehicle wheel rotating axel 2 for the rear wheels, and respective tires 10 are mounted via wheels 3 on these vehicle wheel rotating axels 1, 2. Each of the wheels 3 on which each of the tires 10 are mounted has a valve 20 with an air ingress and egress aperture, and accommodated in each of the valves 20 is a small, tag-shaped tire pressure/temperature detection device. The small tag-shaped tire pressure/temperature detection device is configured with a sensor for detecting the internal pressure and temperature of the tire 10, an IC tag of an integrated circuit for overall control of the device, an internal antenna for use in transmitting and receiving electromagnetic waves R, a battery for use in driving the device, and the like.

A reader antenna 40, as an external antenna for transmitting and receiving data and commands from internal antennae of each of the valves 20, is fitted to the vehicle body. The reader antenna 40 is connected to a reader-writer (referred to below as R/W) 42 via a transmission path 41 of a coaxial cable or the like. The R/W 42 is driven by high frequency power supplied by the high frequency power source 43, is a device for processing all of the data relating to the tire pressure/temperature detection devices inside all of the valves 20, and is connected to a display device 44. The display device 44 is installed in the vehicle cabin, and is a device for displaying to the driver incoming information relating to the physical condition of the tire 10 that is sent from the R/W 42.

As shown in FIG. 3B, the valve 20 accommodating the tire pressure/temperature detection device is fixed to the wheel 3, and a ring shaped tire 10 is mounted to the outer peripheral surface of the wheel 3 in a removable state. In the tire 10 is embedded metal wire or metal mesh formed from steel material or the like, as reinforcement material 13 for increasing the tire strength. Electromagnetic waves R, transmitting data of the internal air pressure and temperature of the tire 10, are radiated from the internal antenna of the valve 20, and these electromagnetic waves R are received by the reader antenna 40, the received signal is processed by the R/W 42, and values of the air pressure and temperature within the tire 10 are displayed on the display device 44.

FIGS. 4A and 4B are block diagrams of the valve 20 of FIGS. 3A and 3B. FIG. 4A is an external view of the front of the valve 20. FIG. 4B is an external view of the back thereof.

The valve 20 has a case shaped valve body 21 that opens to the back side thereof, and accommodates the tire pressure/temperature detection device, and at a side face of the valve body 21 protrudes a cylindrical shaped air egress and ingress aperture 22. The air egress/ingress aperture 22 is made of a strong metal, for example aluminum alloy or steel, and the rest of the valve body is made from a resin or the like. An air passage hole 23 is formed in the valve body 21 for communicating to the inside of the tire 10 from the air egress/ingress aperture 22. The opening portion at the back of the valve body 21 is constructed to be closed off with a back cover 24, protecting internal portions of the device, so that the device does not fall out of the valve body 21. On the cover 24 is formed a post 25 for positional alignment of the valve body and the back cover 24.

FIG. 5 is an internal block diagram of the valve 20 of FIGS. 4A, B as seen when the back cover 24 has been removed.

Accommodated in the valve body is a button battery 26 for supplying power, and a tire pressure/temperature detection device 30 connected to the button battery 26, via a transmission path 27 of conductive wire of the like. The tire pressure/temperature detection device 30 has a substrate 31 for mounting circuit elements. On the substrate 31 are mounted an air pressure sensor 32, a temperature sensor 33, an electrical circuit 34, for processing data and overall control of the device, and the electrical circuit 34 is connected to the transmitting antenna 35 that is the internal antenna.

By the mechanism of such a tire pressure/temperature detection device 30, it is possible for a driver, seated in the driver's seat or while driving, to know the air pressure and temperature inside of the tire 10. Since a critical cause of bursting of the tire 10 is the internal air pressure and temperature thereof, if the driver undertakes suitable measures when the condition of the tire 10 becomes dangerous, then a tire explosion and traffic accident may be avoided before they happen.

FIG. 6 is an explanatory diagram of the structure of the tire 10 in FIGS. 3A and B.

The tire 10 has a ring shaped rubber portion 11, and on the inside of the rubber portion 11 is formed a levering portion 12 for levering the tire 10 onto the wheel 3 when mounting. Reinforcement material 13 of metal wire or mesh formed from steel material or the like is embedded in the rubber portion 11 for increasing the tire strength. The cross-section 13a of the reinforcement material 13 looks like loop shaped wire as shown in FIG. 6. There are various ways of arranging the reinforcement material 13, depending on the tire manufacturer, and FIG. 6 shows the simplest arrangement.

However, conventional tire condition detection systems provided with the tire pressure/temperature detection device 30 have the following problems.

The power source of the tire pressure/temperature detection device 30 is the dry button battery 26, and the power of the button battery 26 continuously depletes from the time of insertion into the device. From the specifications of the tire pressure/temperature detection devices 30 on the market, the button battery 26 should be able to continue to supply power to the devices for 10 years or more, but there are hardly any batteries from the button batteries 26 currently on the market that are able to satisfy such a specification. Therefore, in order to slow down the power depletion of the button batteries 26, measures are undertaken, such as, for example, only transmitting data on the air pressure and temperature of the tire 10 to the reader antenna 40 once every 3 minutes or so. But even by taking these measures, it is difficult to prolong the life of the button battery 26 to 10 years.

As another method it is possible to change over to a new battery when the button battery 26 depletes, but more than the cost of the batteries themselves there is the time and expense of changing them over, and there is a problem of damage occurring when changing over tubeless tires and the like, reducing the life of the tire 10. Also, when it is necessary to detect the air pressure and temperature inside the tire 10 at small intervals, such as, for example, transmitting data once every second, a 10 year life battery lasts about 2 or 3 months, and it is obvious that conventional tire condition detection systems are not able to meet the demands of such a specification.

SUMMARY OF THE INVENTION

The tire condition detection system of the invention is provided with: a tire, internally provided with conductive reinforcement material; an external antenna, fixed in proximity to the outside of the tire, and radiating to the tire electromagnetic waves that generate an induced alternating current in the reinforcement material; an internal antenna, fixed at the tire side, receiving an alternating magnetic field generated in the space inside the tire due to the induced alternating current generated in the reinforcement material, and outputting a received signal; a power source, fixed at the tire side, converting the received signal into alternating current power and outputting source power; and a detector, fixed at the tire side, operated by the source power, detecting predetermined conditions inside the tire and transmitting the detected signal by electromagnetic waves to the external antenna via the internal antenna and the reinforcement material.

The induction supply method of the invention is the induction supply method of a tire condition detection system provided with: a tire, internally provided with conductive reinforcement material; an external antenna, fixed in proximity to the outside of the tire, radiating to the tire electromagnetic waves for power use, and receiving electromagnetic waves for signal use; an internal antenna, fixed at the tire side, receiving the electromagnetic waves for power use radiated from the external antenna via the reinforcement material, and transmitting the electromagnetic waves for signal use via the reinforcement material to the external antenna.

Electromagnetic waves are radiated from the external antenna with an alternating magnetic field component substantially parallel to the axis of rotation of the tire, an induced alternating current is generated in the reinforcement material due to the alternating magnetic field component, and a secondary alternating magnetic field is generated in the space between the tire and a wheel due to the induced alternating current. Further, the internal antenna receives the alternating magnetic field that is power supplied by the external antenna and receives the secondary alternating magnetic field, and outputs a received signal; converting the received signal into the source power.

According to the tire condition detection system and induction supply method of the invention, by using power from the main battery or the engine of a vehicle, source power may be supplied to a detector by electromagnetic waves of a particular frequency. This means that the air pressure and temperature and the like of the tires may be constantly detected with good precision, without having to worry about the life and remaining power of a dedicated battery used as a power source.

BRIEF DESCRIPTION OF THE DRAWINGS

Preferred exemplary embodiments of the present invention will be described in detail based on the following figures, wherein.

DETAILED DESCRIPTION OF THE INVENTION

In the best mode of the invention, a new source of power may be substituted in a tire pressure/temperature detection device that conventionally uses a battery power source. By using an external antenna installed external to a tire, and an internal antenna provided inside a valve of the tire, power may be transmitted and received through electromagnetic waves in a predetermined high frequency band. If the electromagnetic waves in a predetermined high frequency band are well matched to the physical structure and electrical structure of the tire, then, in the space between the tire and a wheel, a magnetic field component is distributed that is substantially perpendicular to the plane that includes the maximum diameter of the tire. If the internal antenna is matched to the direction of maximum magnetic field reception, both when the tire rotates, and when the position of the wheel is stopped, substantially stable power may be received. There are none of the worries about battery life and remaining power of conventional devices, and unlimited numbers of transmissions may be made of tire internal air pressure and temperature data, through an external antenna, to a R/W or the like. That is, a completely battery-less tire condition detection system provided with a tire pressure/temperature detection device may be realized.

First Embodiment

Configuration of the First Embodiment

Figure 1A:
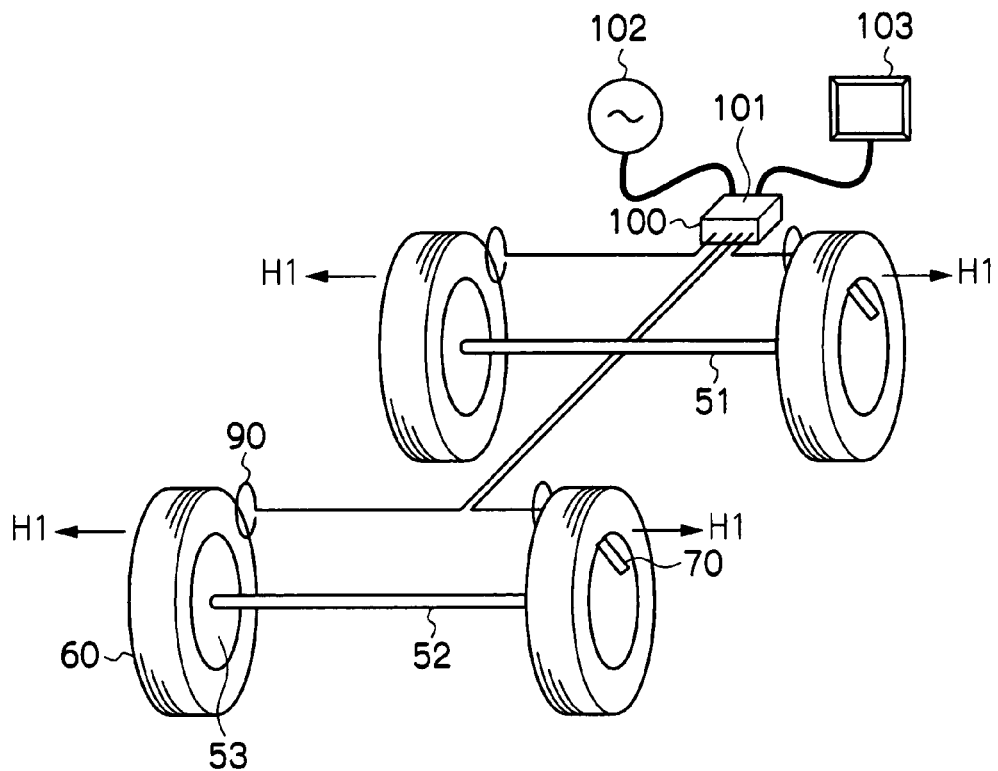
FIG. 1A and FIG. 1B are explanatory diagrams of a tire condition detection system of a first embodiment of the invention.
Figure 1B:
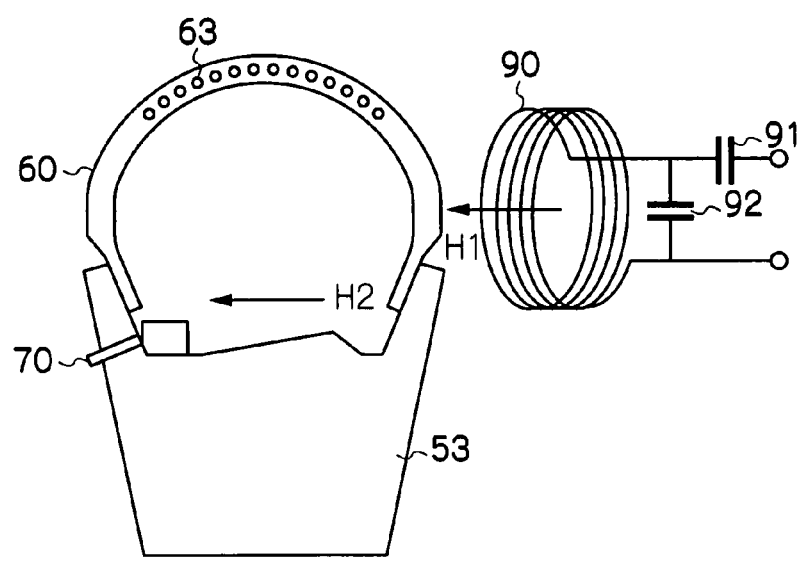

FIGS. 1A and 1B are explanatory diagrams of a tire condition detection system of a first embodiment of the invention; FIG. 1A shows an external view of a structure of the wheels and an antenna system of a vehicle provided with the tire condition detection system of the first embodiment, and FIG. 1B is a diagram showing, in the tire condition detection system of FIG. 1A, a cross-section of a wheel provided with a tire pressure/temperature detection device and a solenoid antenna that is an external antenna.

Figure 3A:
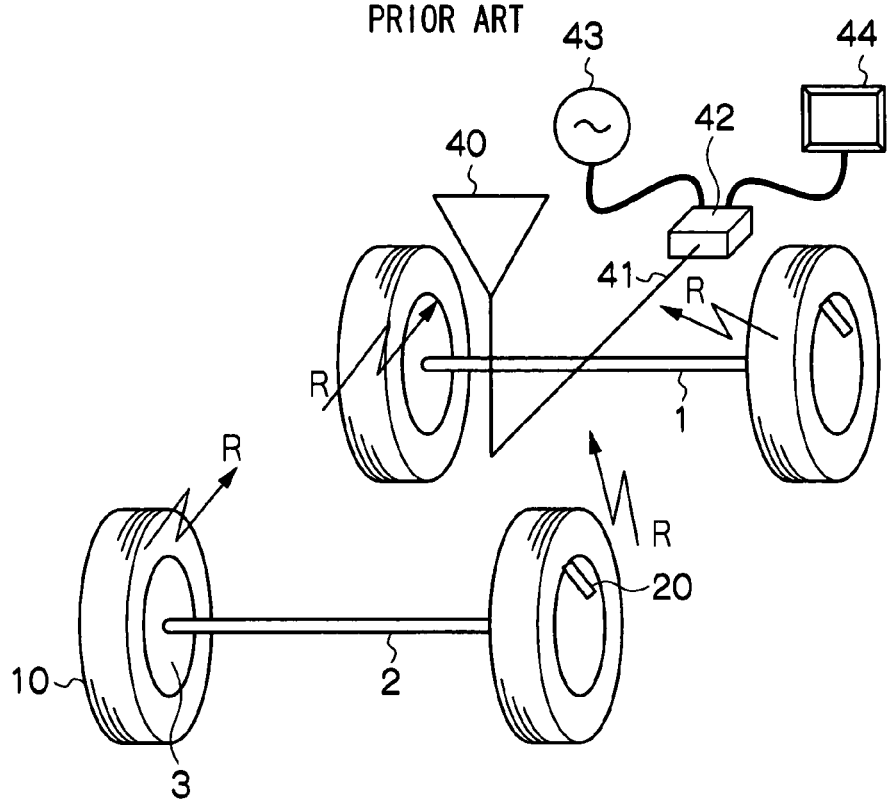
FIG. 3A and FIG. 3B are explanatory diagrams of a conventional tire condition detection system.
Figure 3B:
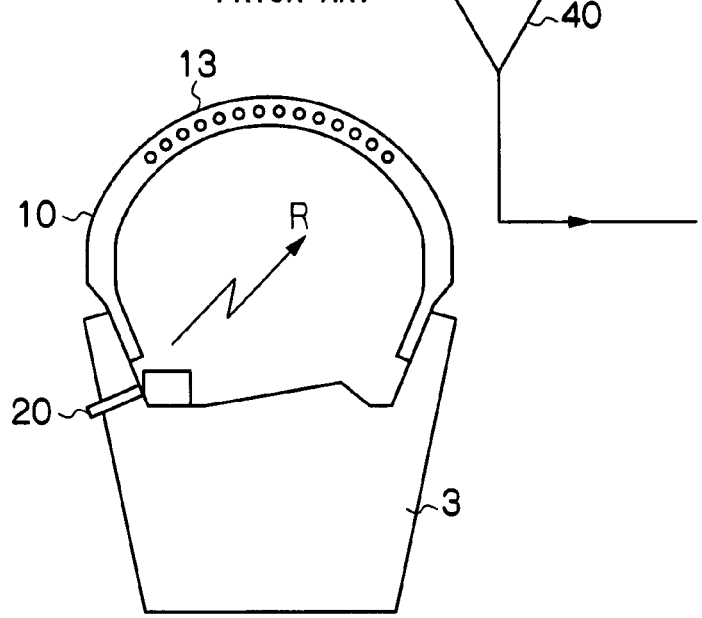
Figure 4A:
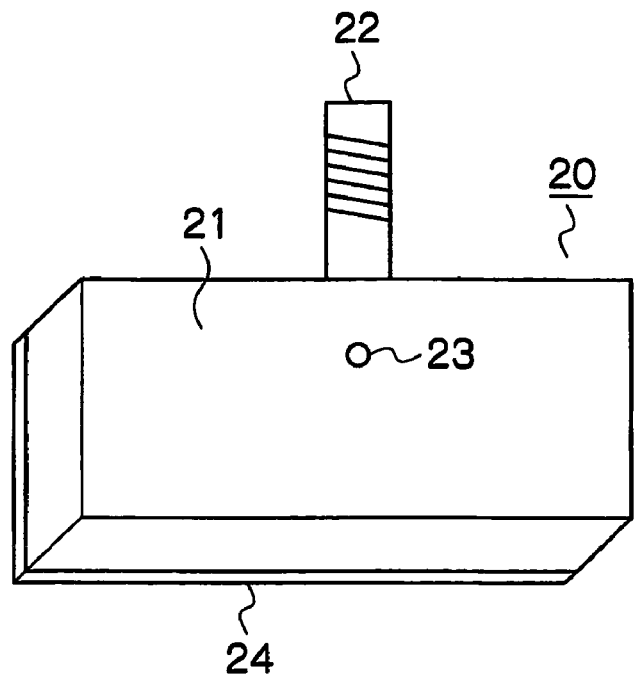
FIG. 4A and FIG. 4B are block diagrams of a valve 20 of FIG. 3B.
Figure 4B:
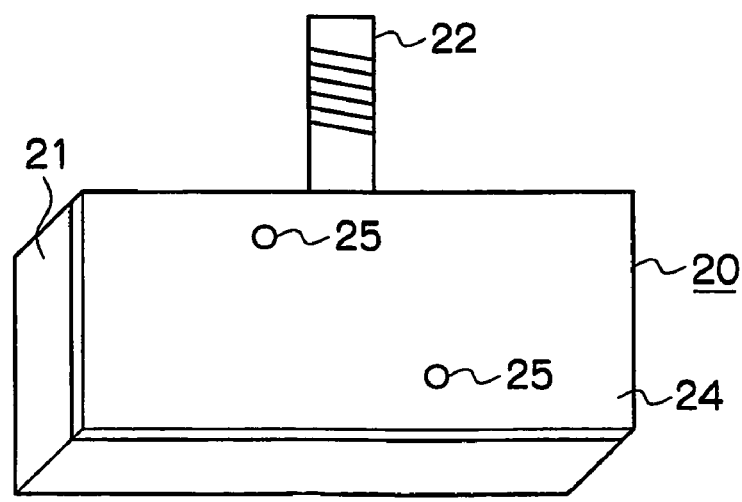

In FIG. 1A, as in conventional FIG. 3A, the vehicle body has been omitted for clarity. The vehicle body, as in conventional FIG. 3A, is provided with a vehicle wheel rotating axel 51 for the front wheels, and a vehicle wheel rotating axel 52 for the rear wheels, and respective tires 60 are mounted via wheels 53 on these vehicle wheel rotating axels 51, 52. Each of the wheels 53 on which each of the tires 60 are mounted has a valve 70 having an air ingress and egress aperture, and accommodated in each of the valves 70 is a power source and a detector (for example a small tag-shaped tire pressure/temperature detection device). The small tag-shaped tire pressure/temperature detection device includes a sensor for detecting the internal pressure and temperature of the tire 60, an IC tag of an integrated circuit for overall control of the device, an internal antenna for use in transmitting and receiving (for example a solenoid antenna), and the like.

The vehicle body, in contrast to conventionally, has, fixed in the vicinity of a side face of each of the tires 60, respective external antennae (for example solenoid antennae, referred to below as "small circular antennae") 90. Each small circular antenna 90 has a function for generating an alternating magnetic field H1 by excitation, and transmitting electrical power to each of the solenoid antennae within the valve 70, and also each small circular antenna 90 has a function for receiving data on the tire internal pressure and temperature from that solenoid antenna. Each small circular antenna 90 is connected to a transmitter receptor 101 via a transmission path 100 of a coaxial cable or the like. The transmitter receptor 101 has a power transmitter function for transmitting electrical power to each of the small circular antennae 90 based on high frequency electrical power supplied from a high frequency power source 102, and the transmitter receptor 101 has a receiver function for receiving a transmission signal from the side of each tire, sent via the small circular antenna 90, and a display device 103 is connected to these. The display device 103 is provided within the vehicle and is a device for displaying to a driver information relating to the physical condition of the tires 60 that is sent from the transmitter receptor 101.

As seen in FIG. 1B, the small circular antennae 90 placed in the vicinity of the tires 60, have resistance and inductance, and, in order to receive high frequency power from the high frequency power source 102 with good efficiency, they need a matching circuit configured of condensers. In FIG. 1B is shown an outline diagram of the small circular antenna 90 combined with a matching circuit. In the small circular antenna 90 two matching condensers 91, 92 are connected, and by these matching condensers 91, 92 a matching circuit is formed between the small circular antenna 90 and the high frequency power source 102.

For simplicity, in the description below, matching for use with a reader antenna like the small circular antenna 90 is not mentioned, but is generally necessary. Further, structurally in the reader antenna there are parallel portion(s), like the matching condensers 91, 92, and serial portion(s). It follows that, in the description below, even when a reader antenna matching circuit is not indicated it should be presumed that there is one present.

An alternating current magnetic field is generated around the small circular antenna 90, and in the first embodiment, the energy of a magnetic field component is used, and electromotive force is generated in the solenoid antenna provided in the valve 70, and this electromotive force is used for the power source of the tire pressure/temperature device.

The valve 70 accommodated in the tire pressure/temperature detection device, as conventionally, is fixed to the wheel 53, and the tire 60 of a ring shape is detachably mounted on the outer peripheral surface of the wheel 53. In the same way as conventionally, the tire 60 is a tire formed with steel material, electro conductive synthetic resin fibers and the like, electro conductive reinforcement material 63 of a mesh or the like embedded therein, for increasing the tire strength. This reinforcement material 63 becomes an impediment at certain frequency region(s), but for certain frequency bands it does not impede the propagation of electromagnetic waves. In the first embodiment, for example, electromagnetic waves of 13.56 MHz are used, but in practice electromagnetic waves of about 5 MHz to about 50 MHz may be used.

In FIG. 1B the cross-section of the lower half portion of the wheel is not shown, but it is the same as the cross-section if the upper half portion, but with the valve 70 removed. Also, by the induction phenomenon of the reinforcement material 63 provided in the tire 60, a substantially uniform alternating magnetic field H2 is distributed in the space between the tire 60 and the wheel 53, but the coupling amount (S21 in terms of S parameter) of the small circular antenna 90 and the solenoid antenna provided in the valve 70 is, depending on the type of the tire 60, from about minus twenty dB (decibels) to about minus thirty dB.

The value of the coupling amount S21 indicates the magnetic energy transmission reception level between the solenoid antenna provided in the valve 70 and the small circular antenna 90, and therefore, under certain conditions, the higher the value is, the smaller the magnetic energy may be for transmitting/receiving a signal.

Further, by Faraday's Law of electro magnetic inductance, when a magnetic field of magnetic flux Φ passes through an induction loop, if there are variations with time thereof, then an electromotive force E is generated so as to weaken the amount of change of magnetic flux, and an alternating current flows in the induction loop to generate a magnetic field in the opposite direction to the magnetic field. The electromotive force E is shown in the following equation (1).

$$E = -d\Phi/dt \quad (1)$$

In the equation (1), Φ is equivalent to the product of the magnetic permeability μ inside the solenoid antenna provided in the valve 70, the surface area of the loop and the intensity of the alternating magnetic field H, and is the magnetic flux that passes through the antenna. The first embodiment mainly uses this phenomenon.

The direction of the alternating magnetic field H1 generated by the small circular antenna 90 installed in the vicinity of the tire 60 is substantially parallel to the rotational axis of the tire 60, and, maximum induced electromotive force may be obtained if it is well matched to the impedance of the solenoid antenna provided in the valve 70.

The tire 60 has a diameter of, for example, between about 30 cm to about 180 cm. The small circular antenna 90 structure is a solenoid shape of several turns to ten or so turns of conductive wire with an insulating cover wound into a circular shape, with a diameter of the circular shape being several cm to ten or so cm, or a construction compressed to a thickness of about 1 cm to about 2 cm in the center axial direction of the solenoid. The electromagnetic field radiated by the small circular antenna 90 has a frequency band, for example, from about 10 KHz to about 100 MHz, and is placed at a distance of several cm to twenty or so cm from the side face of the tire 60.

Figure 2A:
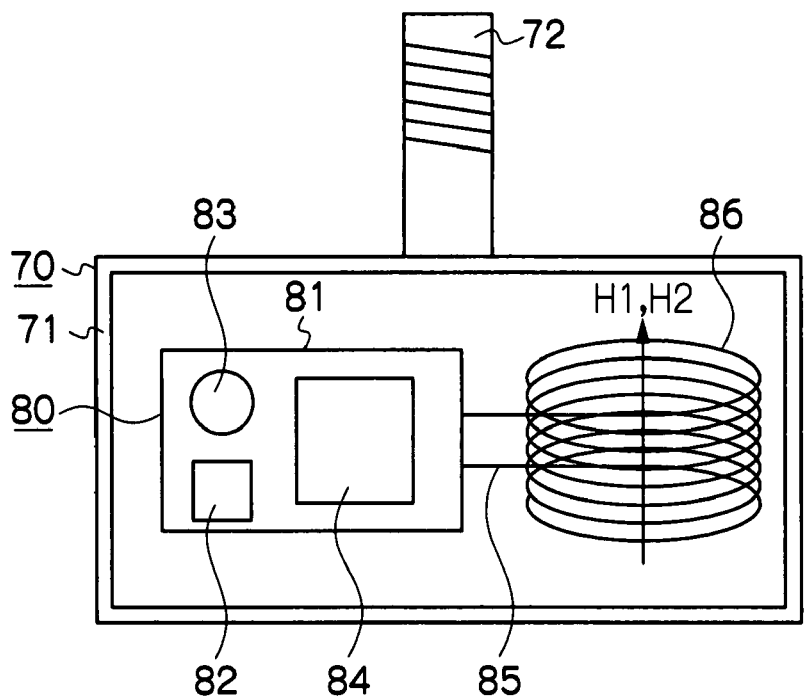
FIG. 2A and FIG. 2B are diagrams showing internal configurations of a valve 70 of FIG. 1A.
Figure 2B:
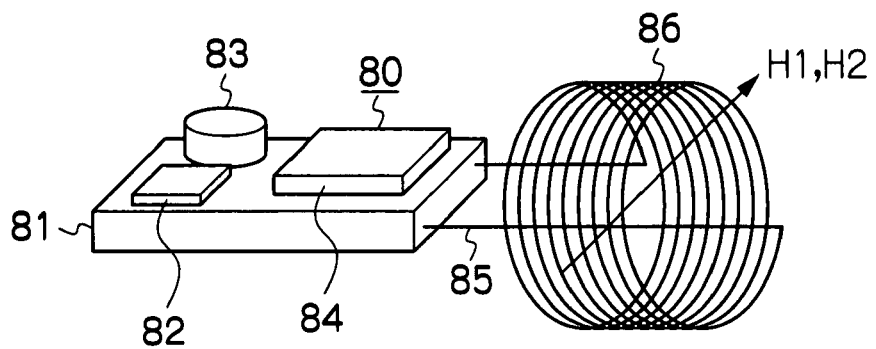

FIGS. 2A and 2B are diagrams showing the configuration of the valve 70 in FIGS. 1A and 1B; FIG. 2A is an internal block diagram of the valve 70 when a back cover thereof has been removed, and FIG. 2B is a perspective diagram of the external appearance of the tire pressure/temperature detection device accommodated therein.

Figure 5:
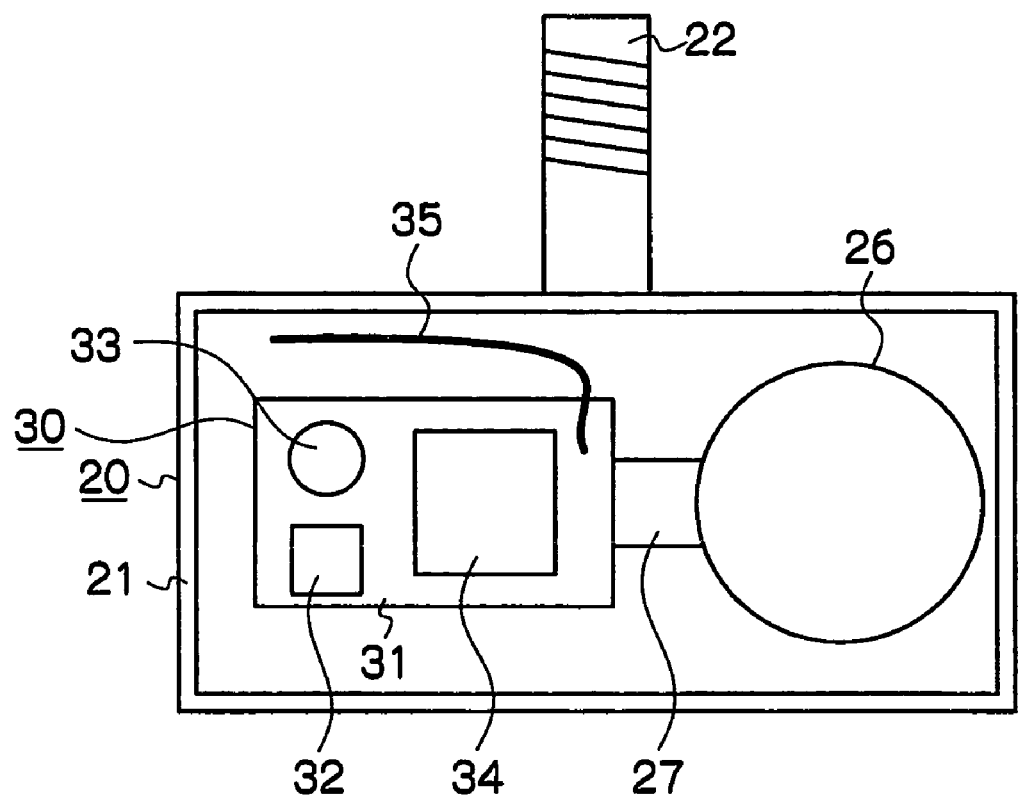
FIG. 5 is a block diagram of an internal circuit when the back face of a back cover 24 of the valve 20 has been removed.

The valve 70, in the same way as in the conventional FIG. 5, has a valve body 71 of a case shape opening to the rear side, and on the side of this valve body 71 protrudes a cylindrical shape air ingress and egress aperture 72. The air ingress and egress aperture 72 may be made from metal such as aluminum alloy, steel or the like, and apart from this the valve body 71 may be made from a resin or the like. A tire pressure/temperature detection device 80 is accommodated in the valve body 71, and structured with the open to the rear side of the valve body 71 closed with an non-illustrated cover.

The tire pressure/temperature detection device 80 has a substrate 81 for mounting circuit elements, and a solenoid antenna 86 as an internal antenna connected to the substrate 81 through a transmission path 85 of conductive wire or the like. On the substrate 81 are mounted, connected to the solenoid antenna 86: an air pressure sensor 82; a temperature sensor 83; an electrical circuit 84 for processing data and overall control of the device; and non-illustrated power supply means (for example, a power supply unit) and the like. The non-illustrated power supply unit is a circuit that converts the reception signal received from the solenoid antenna 86 to alternating current, and supplies each of the circuit elements.

The solenoid antenna 86 is an antenna made from about 10 turns of copper wire and having about the same diameter as a button battery 26 in conventional FIG. 5 (10 mm, for example), and an alternating magnetic field H3 is generated by electromagnetic induction of the alternating magnetic fields H1, H2 radiated from the external small circular antenna 90. This solenoid antenna 86 is disposed so that the plane of the loop therein is orthogonal to the alternating magnetic fields H1, H2, in order to obtain the maximum induced electromotive force.

Normally there is a matching circuit provided between the solenoid antenna 86 and the substrate 81 for mounting the circuit elements, and efficient transmission of high frequency signals may be made, suppressing the reflectance loss therebetween. The matching circuit is structured with one parallel condenser, and one serial condenser, but is omitted from FIGS. 2A and B.

Operation of the First Embodiment

Since a characteristic of the first embodiment is an induction power supply method related to a power supply role undertaken by an electric supply antenna in a tire condition detection system, in a tire pressure/temperature detection device 80 with the conventional button battery 26 removed, explanation will focus on the antenna, and explanation of other elements not related to induction supply operation will be omitted.

In FIGS. 1A and 1B, high frequency power, for example several watts in the 13 MHz band, is transmitted from the high frequency power source 102 to the transmitter receptor 101, and distributed here according to requirements for high frequency power, or supplied to each of the small circular antenna 90 through the transmission path 100 by switching a switch either mechanically or electrically. Each of the small circular antennae 90 are provided with a matching circuit configured by matching condensers 91, 92, and therefore radiate efficiently as electromagnetic waves the high frequency power supplied from the transmitter receptor 101, and since each of the small circular antennae 90 are configured in the shape of a solenoid, a strong magnetic field component radiated in the central axial direction. Also, this central axis is substantially parallel to the rotational axis of the tire 60, and so an alternating magnetic field H1 is radiated to the rubber portion of the tire.

Figure 6:
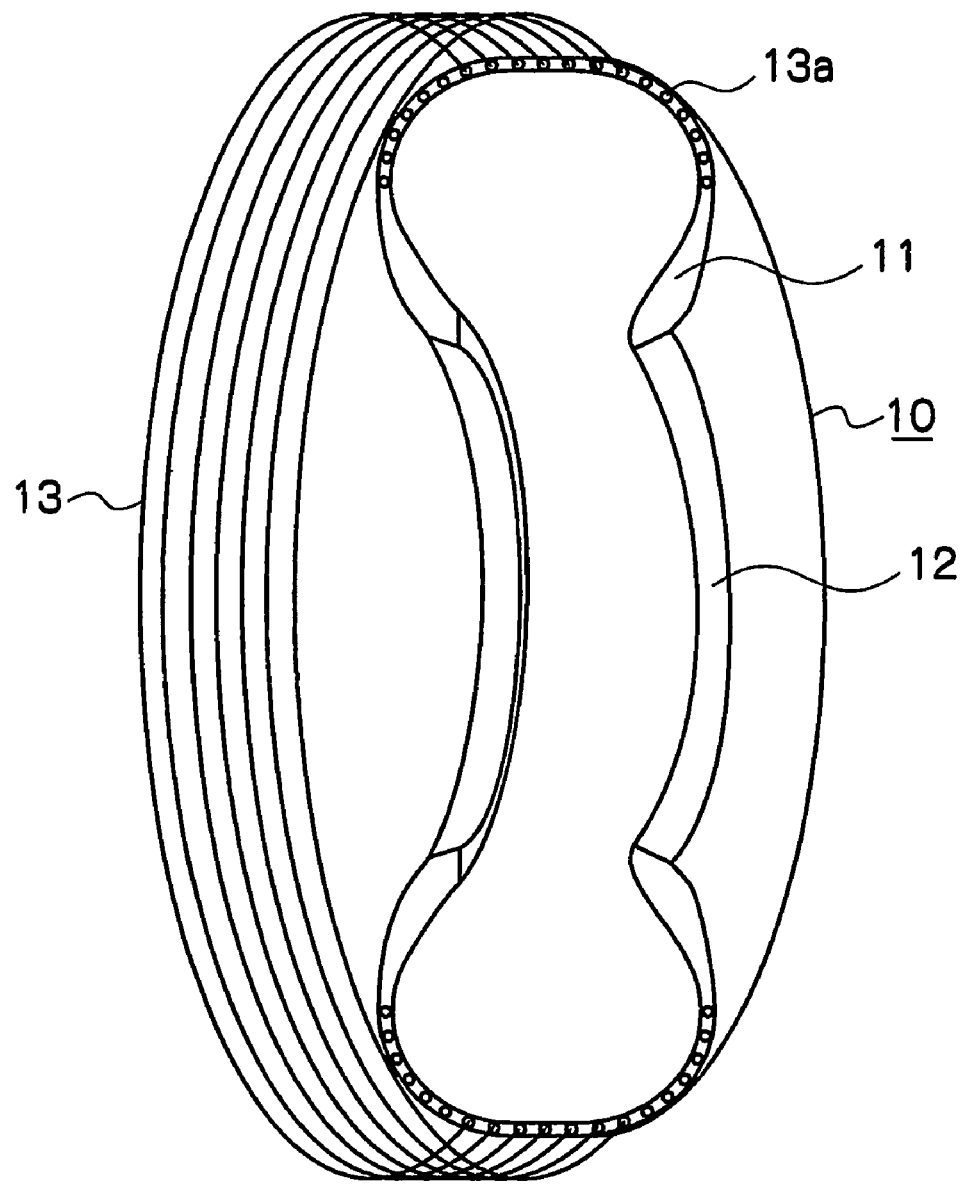
FIG. 6 is an explanatory diagram of the construction of a tire 10 of FIG. 3B.

The tire 60 (10), as shown in FIG. 6, has a reinforcement material 13 (63), of a loop shape, solenoid shape or mesh shape of metal wire or the like embedded in the rubber portion 11, and a macroscopic ring shaped conductor is formed of about the diameter of the tire 60 (10), and the alternating magnetic field H1 passes orthogonally therethrough. Therefore, according to Faraday's Law of induction, a ring shaped alternating current flows in the ring shaped conductor, and, by induction, even the portion of the tire 60 far distanced from the small circular antenna 90 radiates a alternating magnetic field H2 of substantially the same intensity as the alternating magnetic field H1 radiated in the vicinity of the small circular antenna 90. As a result, although the relative position of the small circular antenna 90 and the valve 70 changes with rotation of the wheel 53, the amount of alternating magnetic flux passing through the valve 70 is substantially constant.

On the other hand, as shown in FIGS. 2A and 2B, the small circular solenoid antenna 86 accommodated in the valve body 71 is disposed in a position substantially orthogonal to the alternating magnetic fields H1, H2 generated by electromagnetic induction, and receives substantially the maximum amount of alternating magnetic flux, and substantially the maximum electromotive force is generated at the two terminals of the solenoid antenna 86. This electromotive force serves the role of an electrical power source, but it is an alternating current, and so it may be first rectified by a non-illustrated power unit and converted into direct current to give the same functionality as the button battery 26 conventionally mounted as the power source.

The alternating current power obtained in the power unit through the solenoid antenna 86, for example, operates: the air pressure sensor 82; temperature sensor 83; the electrical circuit 84 for controlling data processing and the device overall; acquisition of physical properties inside the tire 60 (for example, pressure, temperature and the like); responding to the small circular antenna 90 after converting signals in the same solenoid antenna 86; transmitting to the transmitter receptor 101 via the transmission path 100; processing; and displaying on the display device 103. A driver may know the internal pressure and temperature and the like of the tire 60 by data displayed on the display device 103.

A characteristic of the first embodiment is that it does not use the button battery 26 that depletes and reduces the supply of electrical power to the sensors and the like, as in the conventional tire pressure/temperature detection device 30, so when responding with the pressure and temperature data acquired in the tire 60 there is no need to make a separate oscillator oscillate, for example to respond with the acquired data on oscillations in the 400 MHz frequency band. By a frequency dividing technique a portion of the high frequency energy may be retained of the frequency of the power supplied from the small circular antenna 90 that is the reader antenna, and therefore the acquired data may be placed on this divided frequency and responded to the small circular antenna 90, and so a separate oscillator is not required.

Effect of the First Embodiment

According to the first embodiment, because of the configuration in which power is supplied from outside to a tire pressure/temperature detection device that would conventionally have been operated by a battery, there are the following effects (1) to (4).

(1) Conventionally, in order to make the life of batteries last for 10 years, data of the internal pressure and temperature of the tire could only be supplied to a driver at a rate of about once every 3 minutes, and when nearing the end of the life of the battery the power from the battery decreases and so data errors increase. In contrast, according to the first embodiment, there is an electromagnetic power supply and there is no worry that the power will drain, therefore fine grained data may be supplied to a driver at a rate of about twice every second, for example.

(2) The fine grained data of (1) above is not only for supply of information relating to the pressure and temperature of the tire 60 to a driver, but it may well be the case that in the near future it will be essential for realizing automated driving of vehicles.

(3) Since it is not necessary to change batteries, not only is the cost of the batteries eliminated but also the time and expense of changing over batteries, and damage to the tire 60 during the operation of changing over batteries, may be completely eliminated. Further, since the disposal of consumed batteries is eliminated, the first embodiment may provide a tire pressure, temperature, and the like detection device that is environmentally friendly.

(4) By insertion of the vehicle key it is possible to instantaneously know the condition of the tire 60, whatever the condition when parked, therefore, accidents due to tire problems may be averted before they occur.

Therefore, the first embodiment can greatly improve the functionality of a tire pressure, temperature and the like detection device conventionally operated by battery, and can greatly contribute to vehicle driving safety and preventing damage due to traffic accidents. Further, batteries having a lifetime of 10 years are highly specific, and incur a cost of disposal afterwards and a large impact on the environment, but these are problems that do not exist at all in the first embodiment.

Mode of Use of the First Embodiment

At the current stage, in the same way as a conventional battery operated tire pressure/temperature detection device, information relating to the pressure and temperature inside tires is provided to a driver, but the fineness of the grain of the data and the reliability of the data is much higher than for a conventional system, and so in the future there is the possibility of application to automatic driving of vehicles.

Second Embodiment

The first embodiment is a tire condition detection system that uses one small circular antenna 90 for one of the tires 60. In contrast, in the second embodiment, there is the same concept as in the first embodiment, but in order to reduce variation in the distribution of the alternating magnetic field H2 generated in the space between the tire 60 and the wheel 53, plural small circular antennae are used. In order to simplify explanation, explanation is given of when two small circular antennae 90-1 and 90-2 are used.

The two small circular antennae 90-1, 90-2 are the same as each other and are connected in parallel to the high frequency power source 102 supplying high frequency power, and therefore should radiate the same alternating magnetic field H1 to the tire 60. Further, in order that the two small circular antennae 90-1, 90-2 do not affect each other, it is necessary to place them in positions that are distanced from each other, for example they may be disposed in positions that are on substantially opposite sides of the center of the tire 60.

Details of a second embodiment will now be explained, with reference to the drawings.

Configuration of the Second Embodiment

Figure 7:
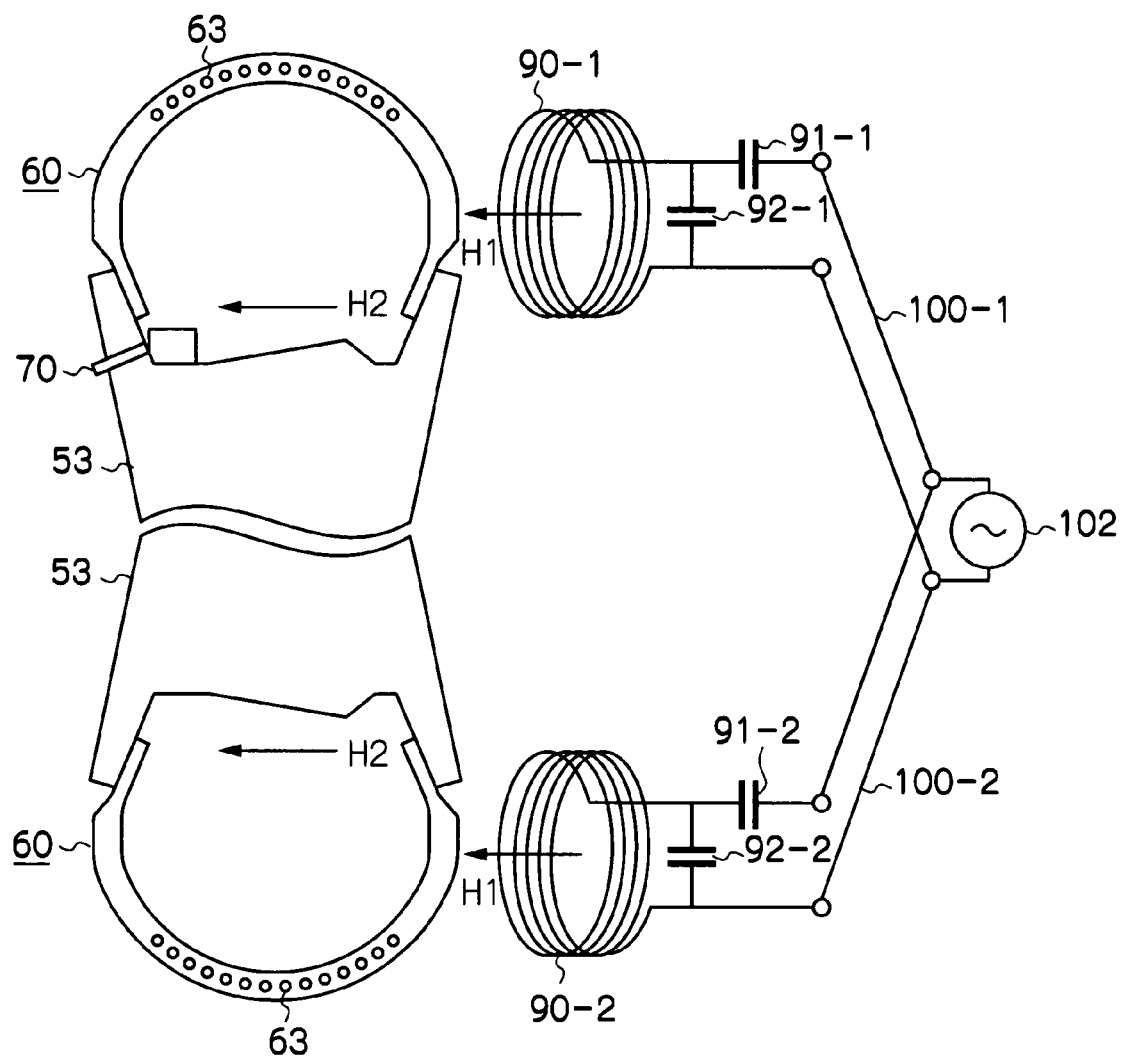
FIG. 7 is an explanatory diagram of the main portions of a tire condition detection system of a second embodiment of the invention.

FIG. 7 is an explanatory diagram showing main portions of a tire condition detection system according to the second embodiment of the invention, and common elements to those of the elements in FIG. 1 of the first embodiment are indicated by the same numerals.

In the second embodiment, the two small circular antennae 90-1, 90-2 are disposed in the vicinity of the side faces of the tire 60, for example in positions that are substantially at opposite sides of the center of the tire 60. The respective small circular antennae 90-1, 90-2 are connected to matching circuits configured by condensers 91-1, 92-1 and by condensers 92-1, 92-2, and are connected to a high frequency power source 102 via each of respective transmission paths 100-1, 100-2 of coaxial cables and the like. Due to respective alternating magnetic fields H1 radiated to the tire 60 from each of the small circular antennae 90-1, 90-2, an alternating magnetic field H2 are generated in the space between the tire 60 and the wheel 53.

The two small circular antennae 90-1, 90-2 are, for example, disposed in positions that are at substantially 90° or more to each other on the circumference of a circle with the rotational axis of the tire 60 at the center, or disposed in positions that are at substantially opposite sides on the circumference of a circle with the rotational axis of the tire 60 at the center. The rest of the configuration is as per the first embodiment.

Operation of the Second Embodiment

The operation of the second embodiment is the same as the operation of the first embodiment, and a brief explanation will be given.

High frequency electrical power is supplied in parallel to each of the small circular antennae 90-1, 90-2, via each of the transmission paths 100-1, 100-2, from the high frequency power source 102, and respective alternating magnetic fields H1, H1 are radiated to a rubber portion of the tire 60, substantially parallel to the rotational axis of the tire 60, from each of the small circular antennae 90-1, 90-2. In the rubber portion of the tire 60 is embedded a reinforcement material 63 of a loop shape, solenoid shape or mesh shape of metal wire or the like, an induced current flows in the reinforcement material 63, and due to this the alternating magnetic fields H2, H2 are generated in the space between the tire 60 and the wheel 53.

When the two small circular antennae 90-1, 90-2 are, for example, disposed in positions that are at substantially opposite sides of the center of the tire 60, then the strengths and weaknesses of each of the generated alternating magnetic fields H1, H1 are symmetrical. Also, since each of the alternating magnetic fields H1, H1 are topologically in phase with each other, the intensities are additive, and variation in the intensity thereof is suppressed by mutual complementation.

The stable intensity alternating magnetic fields H1, H2 generate electromotive force at the two terminals of the solenoid antenna 86 accommodated in the valve 70 by induction, with the effect that power necessary for the operation of the tire pressure/temperature detection device 80 is supplied. Further, the detection signal from an air pressure sensor 82 and a temperature sensor 83 is sent to a display device 103 by the same route and method as in the first embodiment and displayed, presented to a driver.

Effect of the Second Embodiment

The second embodiment is the same in principle as the first embodiment, but to further improve the characteristics the number of small circular antennae 90-1, . . . , is increased, and the generation sources of the in phase alternating magnetic field H2 generated in the space between the tire 60 and the wheel 53 are increased, and by this the intensity of the alternating magnetic field H2 is stabilized and there is the effect of suppressing variation thereof. Therefore, in the second embodiment, by increasing the number of the small circular antennae 90-1, . . . , the cost is slightly increased, but it could be said that the second embodiment is superior to the first embodiment in terms of performance.

Mode of Use of the Second Embodiment

The mode of use of the second embodiment is the same as the mode of use of the first embodiment.

Third Embodiment

The third embodiment is also based on the concept of the first embodiment, but is different in principle to the second embodiment. The third embodiment also has two small circular antennae 90-1, 90-2 used as reader antenna, but the arrangement thereof is different to that in the second embodiment, and is characterized by arrangement sandwiching the tire 60 therebetween.

Configuration of the Third Embodiment

Figure 8:
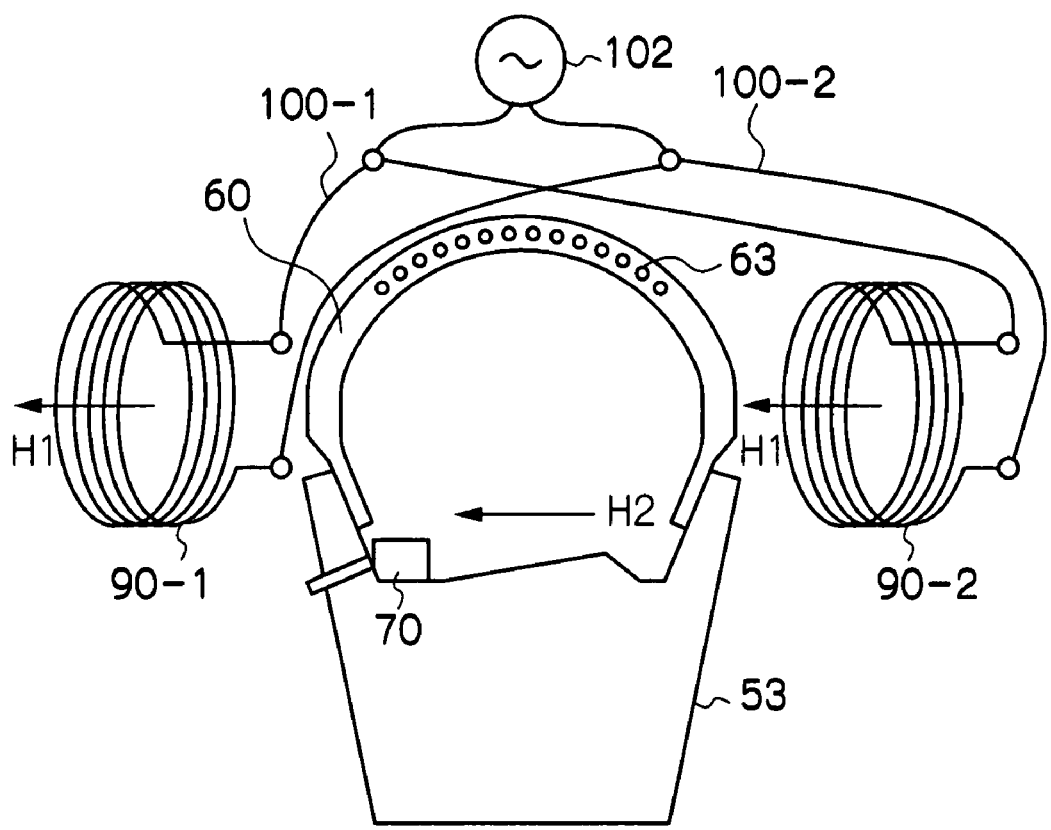
FIG. 8 is an explanatory diagram of the main portions of a tire condition detection system of a third embodiment of the invention.

FIG. 8 is an explanatory diagram showing the main portions of a tire condition detection system according to the third embodiment of the invention, and common elements to those in FIG. 1A, B and FIG. 7 of the first embodiment and second embodiment are indicated by the same numerals.

In the third embodiment there are two small circular antennae 90-1, 90-2 with the same structure disposed in the vicinity of both faces of the tire 60, for example in a pattern of sandwiching the rubber portion of the tire 60, disposed so that they have the same central axis. Respective small circular antennae 90-1, 90-2 are connected to matching circuits configured by condensers 91-1, 92-1 and by condensers 92-1, 92-2, and the small circular antennae 90-1, 90-2 are connected to a high frequency power source 102, via each of respective transmission paths 100-1, 100-2 of coaxial cables and the like. Due to respective alternating magnetic fields H1, H1 radiated to the tire 60 from each of the small circular antennae 90-1, 90-2, an alternating magnetic field H2 is generated in the space between the tire 60 and the wheel 53. Other parts of the configuration are the same as in the first embodiment and the second embodiment.

Operation of the Third Embodiment

The basic operation of the third embodiment is the same as that of the first embodiment, but is different in that two small circular antennae 90-1, 90-2 are used, disposed in a pattern sandwiching the rubber portion of the tire 60.

High frequency electrical power is supplied in parallel to each of the small circular antennae 90-1, 90-2 via each of the transmission paths 100-1, 100-2 from the high frequency power source 102, and alternating magnetic fields H1, H1 are each radiated to a rubber portion of the tire 60, substantially parallel to the rotational axis of the tire 60, from each of the small circular antennae 90-1, 90-2. Each of the small circular antennae 90-1, 90-2 are connected in parallel to the high frequency power source 102, and the generated alternating magnetic fields H1, H1 have the same intensity and direction, and generate alternating magnetic fields H2, H2 in the space between the tire 60 and the wheel 53. These alternating magnetic fields H2, H2 generate an electromotive force in the solenoid antenna 86 accommodated in the valve 70, and operating power is supplied to the air pressure sensor 82, temperature sensor 83 and electrical circuit 84 provided in the valve 70.

The detection signals from the air pressure sensor 82 and the temperature sensor 83 are transmitted to the reader antennae of the two small circular antennae 90-1, 90-2 via the solenoid antenna 86, and sent to a display device 103 by the same route and method as those of the first embodiment and displayed, presented to a driver.

Effect of the Third Embodiment

The third embodiment is in principle the same as the first embodiment, but to further improve the characteristics the number of small circular antennae 90-1, . . . , is increased to two, and the intensity of the induced alternating magnetic field H2 is stronger than the alternating magnetic field H2 of the first embodiment and stronger than the alternating magnetic field H2 of the second embodiment, therefore, the degree of coupling (S21) between the solenoid antenna 86 accommodated in the valve 70 and the two small circular antennae 90-1, 90-2 is, in theory, raised by about 3 dB. In the third embodiment, because the number of small circular antennae 90-1, 90 . . . is raised to 2, the cost is slightly increased, but the third embodiment is superior to the first embodiment in terms of performance. Therefore, the third embodiment contributes to raising the performance of the tire condition detection system 80.

Mode of Use of the Third Embodiment

The mode of use of the third embodiment is the same as that of the first embodiment.

Fourth Embodiment

The fourth embodiment is characterized in that the two small circular antennae 90-1, 90-2 of the third embodiment are connected in series to the high frequency power source 102.

Configuration of the Fourth Embodiment

Figure 9:
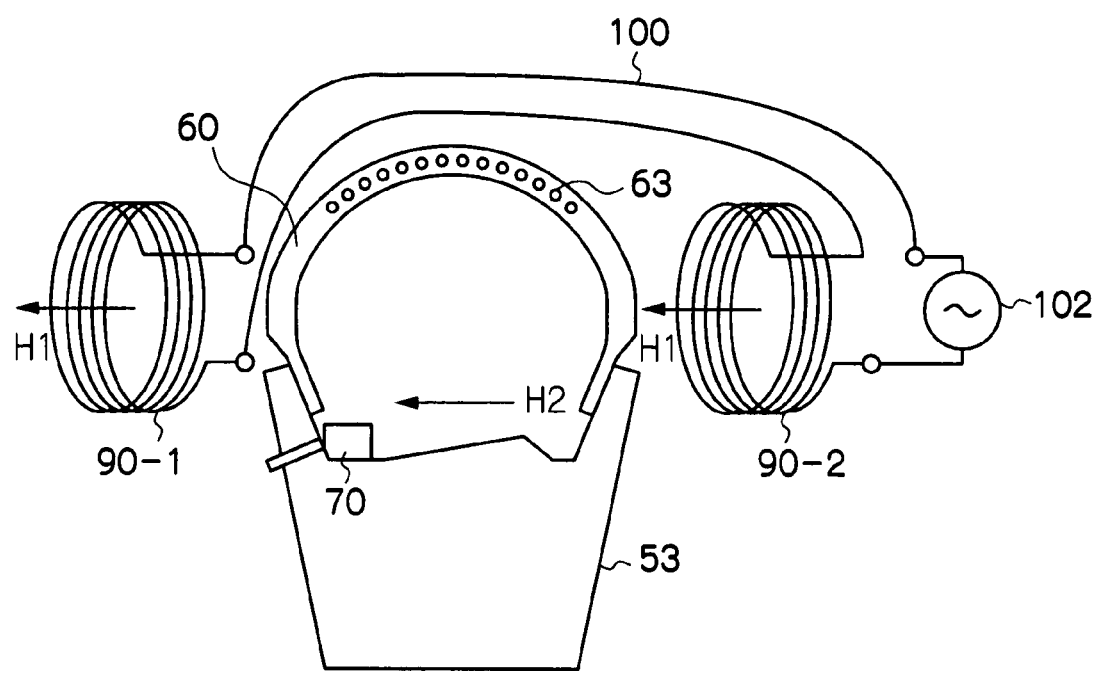
FIG. 9 is an explanatory diagram of the main portions of a tire condition detection system of a fourth embodiment of the invention.

FIG. 9 is an explanatory diagram showing main portions of a tire condition detection system according to the fourth embodiment of the invention, and common elements to those of FIG. 8 are indicated by the same numerals.

In the fourth embodiment, as in the third embodiment, there are two small circular antennae 90-1, 90-2 with the same structure as each other are disposed in the vicinity of both faces of the tire 60 and, for example, they are disposed in a pattern of sandwiching the rubber portion of the tire 60, having the same central axis. This is to reduce the divergence of the magnetic field. The small circular antennae 90-1, 90-2 are, as opposed to in the third embodiment, connected in series to a high frequency power source 102 via each of respective transmission paths 100. A matching circuit of condensers 91, 92 is only required in the small circular antenna 90-2.

By such a configuration, since it may be considered to be a single solenoid, the center of which having been opened out, a matching circuit is only required in practice at the small circular antenna 90-2 that is directly connected to the high frequency power source 102. Each of the small circular antennae 90-1, 90-2 are of the same number of turns and dimensions, and the same alternating current flows, therefore they radiate alternating magnetic fields H1, H1 of the same intensity and direction. Therefore, due to the alternating magnetic fields H1, H1, the alternating magnetic field H2 is generated in the space between the tire 60 and the wheel 53. The other parts of the configuration are the same as in the first embodiment and the second embodiment.

Operation of the Fourth Embodiment

The basic operation of the fourth embodiment is the same as that of the third embodiment, but the small circular antennae 90-1 and 90-2 are not connected in parallel, as they are in the third embodiment, but are connected together in series, and also only the small circular antenna 90-2 is connected to the high frequency power source 102 through a matching circuit.

First, high frequency power is supplied from the high frequency power source 102 through the matching circuit to the small circular antenna 90-2, and also the same alternating current flows from the distal end of the small circular antenna 90-2 to the small circular antenna 90-1. Both of the small circular antennae 90-1, 90-2 have the same number of turns and dimensions, therefore radiate the alternating magnetic fields H1, H1 of the same intensity and direction. Since the alternating magnetic fields H1, H1 are of the same intensity and direction, just as in the third embodiment, the alternating magnetic fields H1, H2 are generated distributed in the space between the tire 60 and the wheel 53. Due to the alternating magnetic fields H1, H2 electromotive force is generated in the solenoid antenna 86 accommodated in the valve 70, and operating power is supplied to the air pressure sensor 82, the temperature sensor 83 and the electrical circuit 84 that are provided in the valve 70.

The detection signals from the air pressure sensor 82 and the temperature sensor 83 are transmitted to the two small circular antennae 90-1, 90-2 via the solenoid antenna 86, and transmitted to the driver via the same means as in the first embodiment.

Effect of the Fourth Embodiment

The fourth embodiment is the same in principle as the third embodiment, but since the small circular antennae 90-1, 90-2 are connected to the high frequency power source 102 in series to each other, two matching circuits are not necessary and a single matching circuit is sufficient.

Also, other effects are the same as those of the third embodiment, by increasing the number of the small circular antennae 90-1, . . . reader antennae so as to improve the characteristics, the induced alternating magnetic field H2 is stronger in intensity than the alternating magnetic field H2 of the first embodiment and then the alternating magnetic field H2 of the second embodiment, and therefore the degree of coupling (S21) of the solenoid antenna 86 accommodated in the valve 70 with the small circular antennae 90-1, 90-2 is raised in theory by about 3 dB. In the fourth embodiment, because the number of the small circular antennae 90-1, . . . has been increased to 2, there is a slight increase in cost, but the fourth embodiment is significantly superior in performance to that of the first embodiment. Therefore, the fourth embodiment contributes to raising the performance of the tire condition detection system 80.

Mode of Use of the Fourth Embodiment

The mode of use of the fourth embodiment is the same as that of the first embodiment.

Fifth Embodiment

The fifth embodiment is characterized by the use of a solenoid antenna 90A, or a solenoid antenna 90B, instead of the small circular antennae 90, 90-1, 90-2 reader antennae of the first to fourth embodiments.

Configuration of the Fifth Embodiment

Figure 10A:
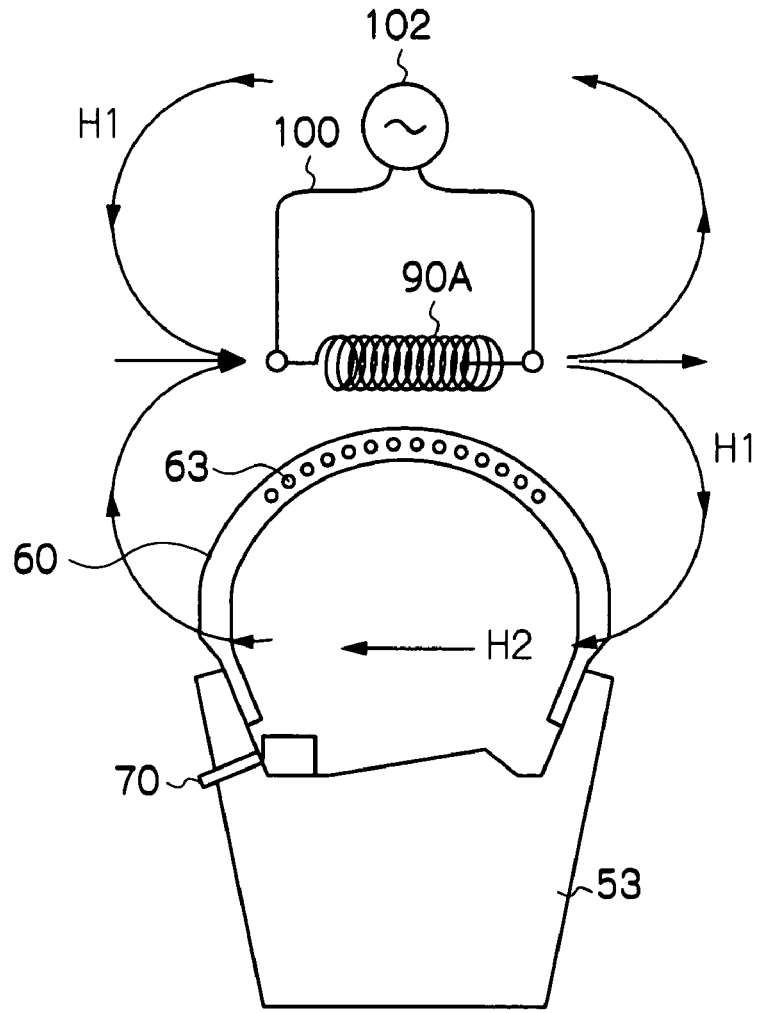
FIG. 10A and FIG. 10B are explanatory diagrams of the main portions of a tire condition detection system of a fifth embodiment of the invention.
Figure 10B:
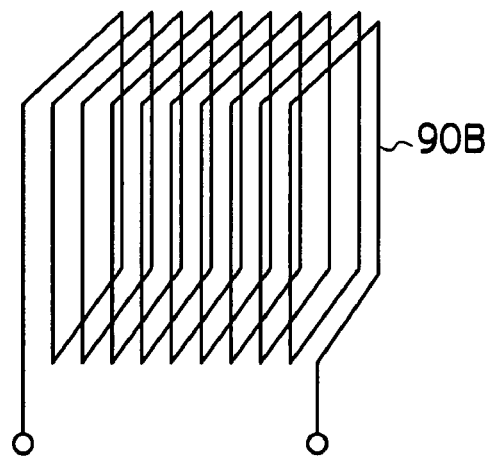
Figure 11:
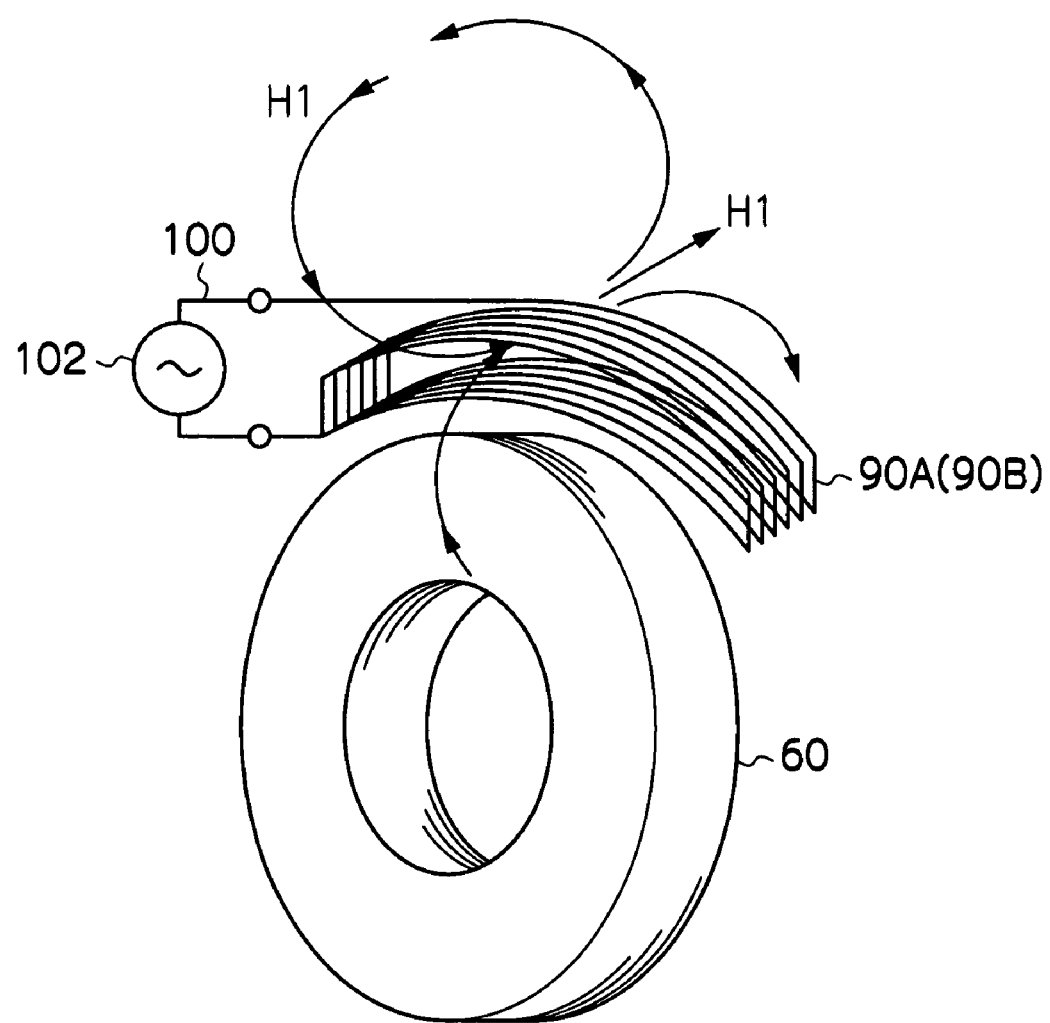
FIG. 11 is an explanatory diagram of the main portions of a tire condition detection system of the sixth embodiment of the invention.

FIGS. 10A, 10B and 11 are explanatory diagrams showing the main portions of the tire condition detection system of the fifth embodiment of the invention. FIG. 10A is a cross-sectional diagram of a circular cross-section solenoid antenna, FIG. 10B is a external view of a rectangular cross-section solenoid antenna, and FIG. 11 is an external view of an arc shaped solenoid antenna. In FIGS. 10A, 10B and 11, common elements to those of the first embodiment are indicated by the same numerals.

In the fifth embodiment, a circular cross-section solenoid antenna 90A as shown in FIG. 10A, or a substantially rectangular cross-section solenoid antenna 90B as shown in FIG 10B, is used instead of the small circular antenna 90 reader antenna of the first embodiment.

As shown in FIG. 10A, the circular cross-section solenoid antenna 90A is disposed in the vicinity of the outer peripheral face of the tire 60. The circular cross-section solenoid antenna 90A has a solenoid body provided with terminals at both ends of a coil shaped conductor, and the two terminals of the solenoid body are connected to the high frequency power source 102 through transmission paths 100 of electrical wires or the like. The solenoid antenna 90A, when supplied with high frequency power from the high frequency power source 102, radiates alternating magnetic force lines generating an alternating magnetic field H1. Therefore, due to this, an alternating magnetic field H2 is generated in the space between the tire 60 and the wheel 53. While not illustrated, it is sometimes necessary to have a matching circuit between the high frequency power source 102 and the solenoid antenna 90A.

As shown in FIG. 10B, the rectangular cross-section solenoid antenna 90B may be used in place of the circular cross-section solenoid antenna 90A. The rectangular cross-section solenoid antenna 90B has a solenoid body provided with terminals at both ends of a coil shaped conductor of substantially square or rectangular shaped turns, and the two terminals of the solenoid body are connected to the high frequency power source 102 through the transmission paths 100.

The solenoid antennae 90A, 90B are, for example, solenoid shapes of several turns, to ten or so turns, of wound conducting wire that has a diameter of about 0.5 mm to about 3 mm, the solenoid shapes having maximum dimensions in cross-section of several cm to ten or so cm. Or, the small circular antennae 90A, 90B may be formed of solenoid shapes of conductive foil of thickness from about ten or so microns to about several hundreds of microns, and widths of about several mm to twenty or so mm.

Further, as shown in FIG. 11, the cross-sectional shapes of solenoid antennae 90A, 90B may be extended in an arc shape around the outer peripheral face of the tire, such that the alternating magnetic field H1 may be radiated onto a wide region of the side face of the tire 60. These arc shaped solenoid antennae 90A or 90B extend in an arc shape over a segment of about 30° to about 60° with respect to the center of the tire 60, and are disposed at a distance of about 10 cm from the outer peripheral face of the tire. The dimensions of the arc shape are, for example, when used on a car wheel, have a maximum dimension of from about 30 cm to about 50 cm.

Other parts of the configurations of FIGS. 10A, 10B and 11 are the same as in the first embodiment.

Operation of the Fifth Embodiment

Since the operation of the fifth embodiment is substantially the same as that of the first embodiment, a brief explanation will be given.

High frequency power is supplied from the high frequency power source 102, through the transmission path 100, to the solenoid antenna 90A (or 90B), and the alternating magnetic field H1 is radiated from both ends of the solenoid antenna 90A (or 90B), substantially parallel to the rotational axis of the tire 60, to a rubber portion of the tire 60. Since a reinforcement material 63 is embedded in the rubber portion of the tire 60, an induced current flows in the reinforcement material 63. Due to this the alternating magnetic field H2 is generated in the space between the tire 60 and the wheel 53.

The alternating magnetic field H2 generates by induction an electromotive force at the two terminals of the solenoid antenna 86 accommodated in the valve 70, with the effect that the necessary power for operating the tire pressure/temperature detection device 80 is supplied. The detection signals from the air pressure sensor 82 and the temperature sensor 83 are transmitted to the driver by the same route and method as those in the first embodiment.

Effect of the Fifth Embodiment

In the fifth embodiment, the solenoid antenna 90A or 90B is disposed so that the central axis thereof is substantially parallel to the rotational axis of the tire 60, and, it appears in FIGS. 10A and 11 that the solenoid antenna 90A or 90B is disposed directly above the tire 60, but it need not necessarily be directly above and may be fixed in a place that is easy to fix depending on the shape of the tire housing.

Since there is effectively left-right symmetry in the alternating magnetic field H1 radiated from the solenoid antenna 90A or 90B, the alternating magnetic field H2 generated by induction in the space between the wheel 53 and the tire 60 also has left-right symmetry of intensity, and in one way the intensity of the electromotive force generated by induction in the two terminals of the solenoid antenna 86 accommodated in the valve 70 is greater compared to that of the first embodiment. Therefore, the fifth embodiment contributes to improving the performance of the tire pressure/temperature detection device 80.

Mode of Use of the Fifth Embodiment

The mode of use of the fifth embodiment is the same as that of the first to fourth embodiments, but when, depending on the type of vehicle, the shape of the tire housing and the electrical characteristics of the tire, it is not possible to fix a small circular antenna 90 at the side face of the tire 60, the fifth embodiment provides a method of fixing above, or at a chosen location at, the outer peripheral face of the tire.

Sixth Embodiment

Configuration of the Sixth Embodiment

Figure 12:
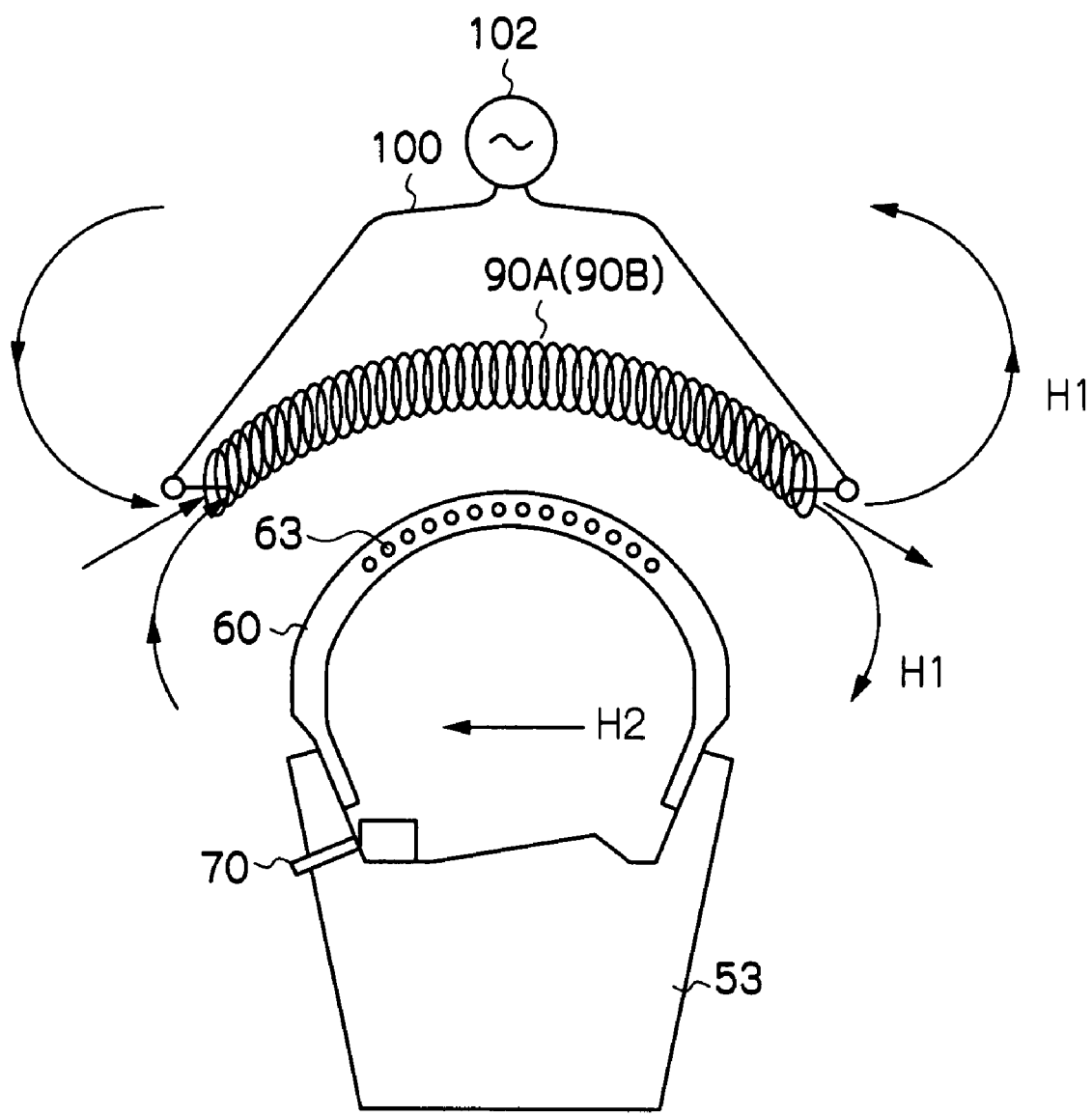
FIG. 12 is an explanatory diagram of a solenoid antenna and tire cross-section of a tire condition detection system of a sixth embodiment of the invention.

FIG. 12 is a cross-sectional diagram showing a solenoid antenna and a tire in a tire condition detection system according to the sixth embodiment of the invention, and common elements to those of the fifth embodiment shown in FIGS. 10A and 10B are indicated by the same numerals.

The sixth embodiment has basically the same structure as that of the fifth embodiment, but the circular cross-sectional solenoid antenna 90A shown in FIG. 10A, or the rectangular cross-sectional solenoid antenna 90B shown in FIG. 10B is disposed orthogonal to the outer periphery of the tire (disposed in the width direction of the outer peripheral face of the tire), and also the central axis of the solenoid antenna 90A or 90B is extended in an arc shape around the width directional face of the outer peripheral face of the tire, so that large amounts of magnetic flux may be made to flow into the space between the tire 60 and the wheel 53. Other parts of the structure are the same as those of the fifth embodiment.

Operation of the Sixth Embodiment

The operation of the sixth embodiment is substantially the same as that of the fifth embodiment, and a brief explanation will be given.

High frequency power is supplied from the high frequency power source 102, through the transmission paths 100, to the arc shaped solenoid antenna 90A or 90B, and the alternating magnetic field H1 is radiated from both ends of the solenoid antenna 90A or 90B, substantially parallel to the rotational axis of the tire 60, to the rubber portion of the tire 60. An induced current flows in the reinforcement material 63 embedded in the rubber portion of the tire 60, and due to this the alternating magnetic field H2 is generated in the space between the tire 60 and the wheel 53.

The alternating magnetic field H2 generates by induction an electromotive force at the two terminals of the solenoid antenna 86 accommodated in the valve 70, with the effect that the power required for the operation of the tire pressure/temperature detection device 80 is supplied. The detection signals from the air pressure sensor 82 and the temperature sensor 83 are transmitted to the driver by the same route and method as those in the first embodiment.

Effect of the Sixth Embodiment

In the sixth embodiment, the arc shaped solenoid antenna 90A or 90B is, as shown in FIG. 12, curved and extended along the width direction surface of the outer peripheral face of the tire 60, and, appears to be disposed directly above the tire 60, but it need not necessarily be directly above and may be fixed in a place that is easy to fix depending on the shape of the tire housing.

Since there is effectively left-right symmetry in the alternating magnetic field H1 radiated from the arc shaped solenoid antenna 90A or 90B, the alternating magnetic field H2 generated by induction in the space between the wheel 53 and the tire 60 also has left-right symmetry of intensity, and, much the same as in the fifth embodiment, in one way the intensity of the electromotive force generated by induction in the two terminals of the solenoid antenna 86 accommodated in the valve 70 is greater compared to that of the first embodiment. Therefore, the sixth embodiment contributes to improving the performance of the tire pressure/temperature detection device 80.

Mode of Use of the Sixth Embodiment

The mode of use of the sixth embodiment is the same as that of the fifth embodiment, but since the shape of the arc shaped solenoid antenna 90A or 90B substantially matches that of the tire housing, the sixth embodiment is easier to fix than the fifth embodiment, and provides a method of fixing above, or at a chosen location at, the outer peripheral face of the tire.

Seventh Embodiment

The seventh embodiment is a configuration inserting a bar shaped core 93, which is mainly of material such as soft iron, ferrite or the like, into the central axial region of the small circular antennae 90, 90-1, 90-2 and the solenoid antenna 90A and 90B used in the first to the sixth embodiments, suppressing divergence of the alternating magnetic field H1 radiated from the respective antennae 90, . . . raising the induction efficiency and concentrating the alternating magnetic field H2 induced in the space between the wheel 53 and the tire 60.

Since the philosophy is the same, application of the seventh embodiment to the easily explained fifth embodiment will be used as a representative example, and the seventh embodiment will be explained below.

Configuration of the Seventh Embodiment

Figure 13:
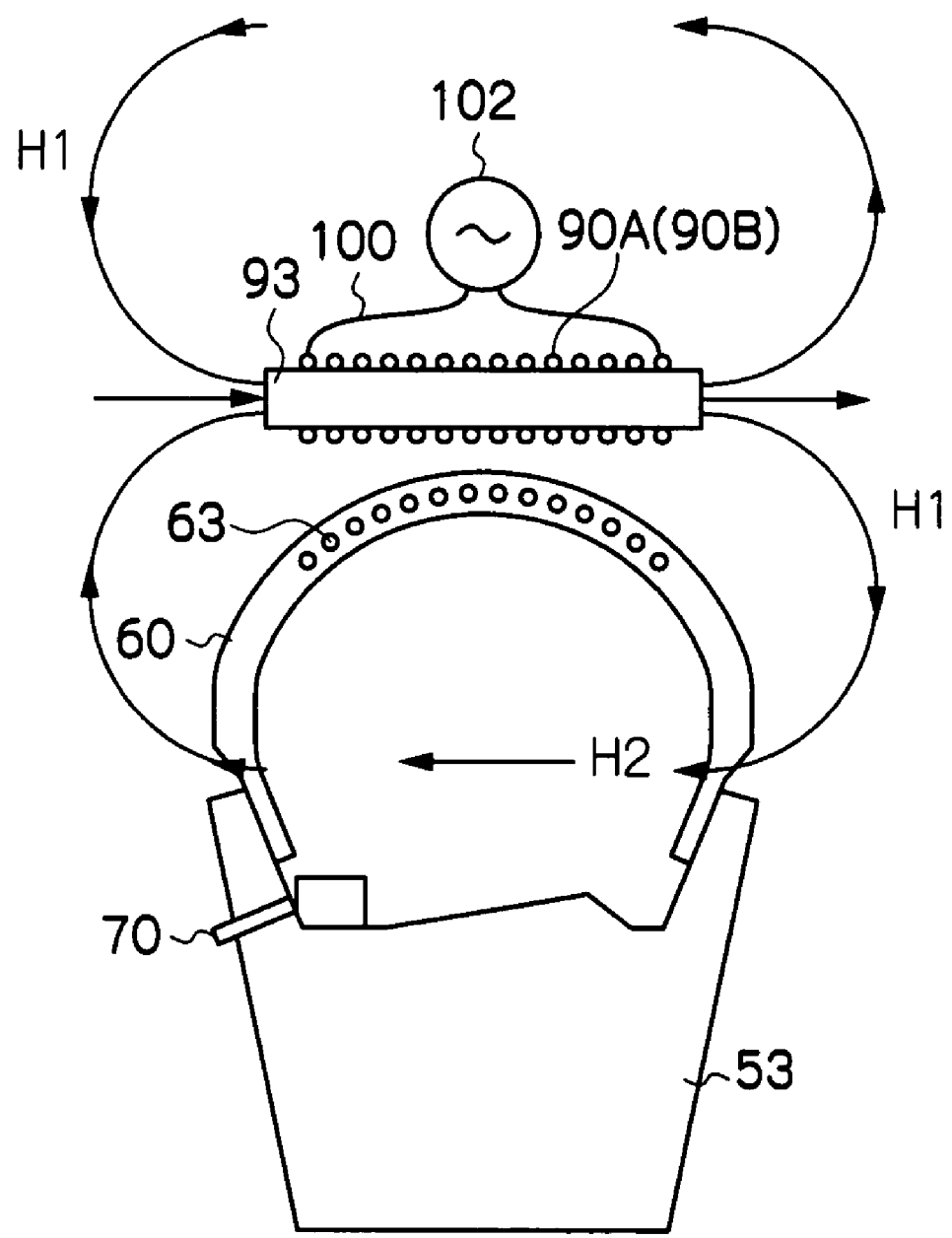
FIG. 13 is an explanatory diagram of a solenoid antenna and tire cross-section of a tire condition detection system of a seventh embodiment of the invention.

FIG. 13 is a cross-sectional diagram showing a solenoid antenna and tire of a tire condition detection system of the seventh embodiment, and common elements to those of the fifth embodiment shown in FIGS. 10A and 10B are indicated by the same numerals.

In the seventh embodiment, the structure is basically the same as that of the fifth embodiment, but it differs in that a bar shaped core 93, which is mainly of material such as soft iron, ferrite or the like, is inserted into the central axial region of the circular cross-section solenoid antenna 90A or the rectangular cross-section solenoid antenna 90B used in the fifth embodiment, with other parts of the configuration being the same as those of the fifth embodiment.

Operation of the Seventh Embodiment

The operation of the seventh embodiment is substantially the same as that of the fifth embodiment, and a brief explanation will be given.

High frequency power is supplied from the high frequency power source 102, through the transmission path 100, to the solenoid antenna 90A or 90B, and the alternating magnetic field H1 is radiated, substantially parallel to the rotational axis of the tire 60, from both ends of the solenoid antenna 90A or 90B. Because of the presence of the bar shaped core 93 in the seventh embodiment, the alternating magnetic field H1 radiated from both ends of the solenoid antenna 90A or 90B does not immediately diverge, and is concentrated in a narrow region of the rubber portion of the tire 60. Since there is the reinforcement material 63 embedded in the rubber portion of the tire 60, an induced current that is stronger than if there was no bar shaped core 93 present flows in the reinforcement material 63, and due to this the alternating magnetic field H2, which is stronger than would have been the case if there was no bar shaped core 93, is generated in the space between the tire 60 and the wheel 53.

The alternating magnetic field H2 generates by induction an electromotive force, which is stronger than would have been the case if there was no bar shaped core 93, at the two terminals of the solenoid antenna 86 accommodated in the valve 70, with the effect that the power required for the operation of the tire pressure/temperature detection device 80 is supplied. The detection signals from the air pressure sensor 82 and the temperature sensor 83 are transmitted to the driver by the same route and method as those in the first embodiment.

Effect of the Seventh Embodiment

According to the seventh embodiment, due to the effect of concentrating the magnetic force of the inserted bar shaped core 93 in the antennae 90, 90-1, 90-2, 90A, 90B, a stronger electromotive force is generated at the two terminals of the solenoid antenna 86 accommodated in the valve 70 than those of the first to sixth embodiments, and more sensors may be operated, and more information relating to the inside of the tire may be provided to the driver. Therefore, that the seventh embodiment contributes to improving the performance of the tire pressure/temperature detection device 80.

Mode of Operation of the Seventh Embodiment

The mode of operation of the seventh embodiment is the same as the modes of operation of respective first to sixth embodiments.

Eighth Embodiment

In the seventh embodiment, by insertion of a core into the respective antennae 90, 90-1, 90-2, 90A, 90B of the first to sixth embodiments, the magnetic force concentrating effect of the respective antennae 90, . . . is raised.

In the eighth embodiment the philosophy is the same, but instead of the bar shaped core 93, a C-shaped core 94 is used, raising the magnetic force concentrating effect even further.

Configuration of the Eighth Embodiment

Figure 14:
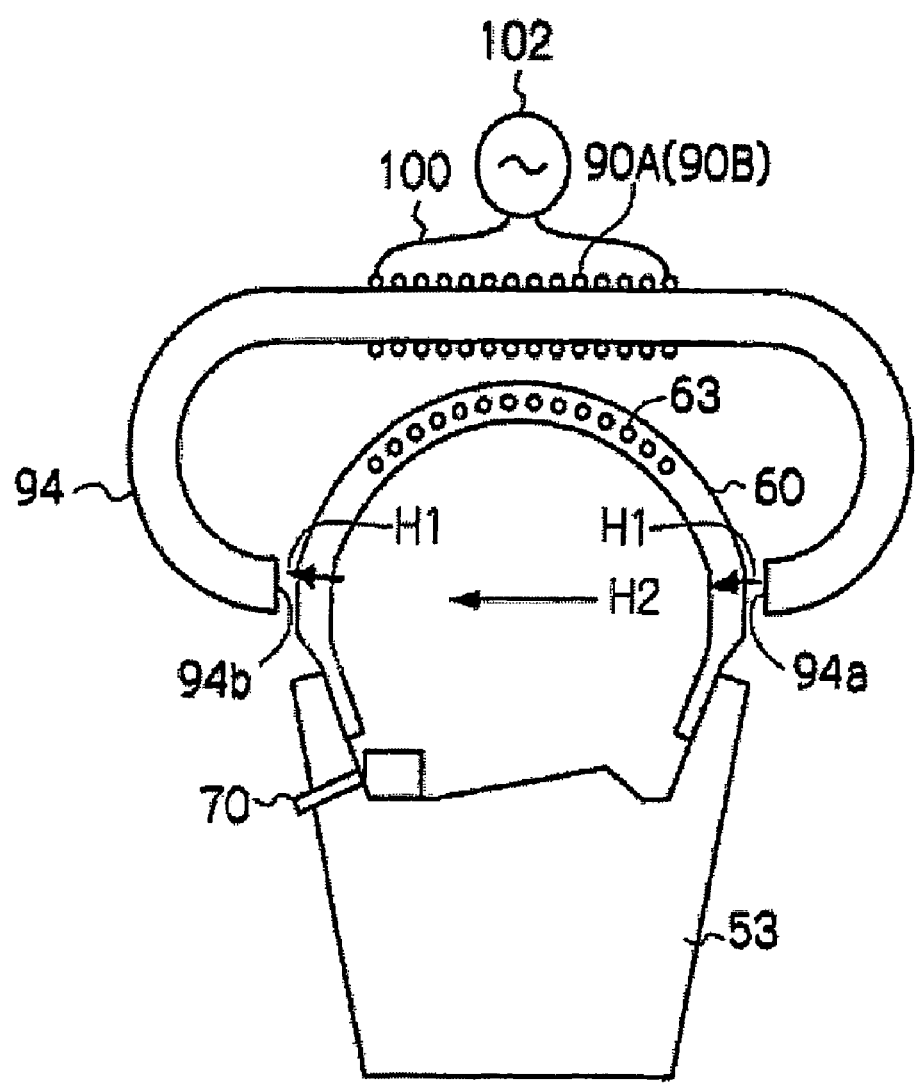
FIG. 14 is an explanatory diagram of a solenoid antenna and tire cross-section of a tire condition detection system of an eighth embodiment of the invention.

FIG. 14 is a cross-sectional diagram showing a solenoid antenna and tire of a tire condition detection system of the eighth embodiment and common elements to those of the fifth embodiment shown in FIGS. 10A and 10B are indicated by the same numerals.

The reader antenna applied to the eighth embodiment, are the same as the circular cross-sectional solenoid antenna 90A or the rectangular cross-sectional solenoid antenna 90B of the fifth embodiment, and the C-shaped core 94, which is mainly of material such as soft iron, ferrite or the like, is inserted into the central axial region of the solenoid antenna 90A or solenoid antenna 90B. The C-shaped core 94 has left and right end faces 94a and 94b that face each other, both the end faces 94a, 94b are vertical, and from whichever face lines of magnetic force are radiated, these lines are largely focused on the opposite face. Due to these lines of magnetic force on alternating magnetic field H2 is generated in the space between the wheel 53 and the tire 60.

The separation of the end faces 94a, 94b is adjustable, and as a rough guide, if the separation is slightly greater than the separation of the two side faces of the tire 60 then the intensity of the alternating magnetic field H2 distributed in the space between the tire 60 and the wheel 53 is thought to be the strongest of the above embodiments. However, if the end faces 94a, 94b are too close to the two side walls of the tire 60 then, depending on the condition of the tire, it is possible that driving could be impeded, so it is better to provide the end faces 94a, 94b at about 5 cm or more from the side faces of the tire 60.

Operation of the Eighth Embodiment

The operation of the eighth embodiment is substantially the same as that of the fifth embodiment, and a brief explanation will be given.

High frequency power is supplied from the high frequency power source 102, through the transmission path 100, to the solenoid antenna 90A or 90B, and the alternating magnetic field H1 is radiated, substantially parallel to the rotational axis of the tire 60, from both end faces 94a, 94b of the solenoid antenna 90A or 90B. Because of the presence of the C-shaped core 94 in the eighth embodiment, the magnetic force lines of the alternating magnetic field H1 radiated from both ends of the solenoid antenna 90A or 90B nearly all pass through the C-shaped core 94 and are radiated from the end faces 94a, 94b.

Since, as in the fifth embodiment, there is the reinforcement material 63 embedded in the rubber portion of the tire 60, a strong induced current flows in the reinforcement material 63, and due to this a strong alternating magnetic field H2 is also generated in the space between the tire 60 and the wheel 53. The alternating magnetic field H2 generates by induction a strong electromotive force at the two terminals of the solenoid antenna 86 accommodated in the valve 70, with the effect that the power required for the operation of the tire pressure/temperature detection device 80 is supplied. The detection signals from the air pressure sensor 82 and the temperature sensor 83 are transmitted to the driver by the same route and method as those in the first embodiment.

Effect of the Eighth Embodiment

According to the eighth embodiment, since the C-shaped core 94 is provided, a strong alternating magnetic field H2 is generated in the space between the tire 60 and the wheel 53. Due to this a strong electromotive force is generated at the terminals of the solenoid antenna 86 accommodated in the valve 70, and more sensors may be operated, and more information relating to the inside of the tire may be provided to the driver. Therefore, the eighth embodiment contributes to improving the performance of the tire pressure/temperature detection device 80.

Mode of Use of the Eighth Embodiment

The mode of use of the eighth embodiment is the same as that of the first embodiment, but when, depending on the type of vehicle, the shape of the tire housing and the electrical characteristics of the tire, it is not possible to fix, as in the first embodiment, a small circular antenna 90 at the side face of the tire 60, the eighth embodiment makes it possible to fix the C-shaped core 94 to a suitable place on the tire housing and bring only the end faces 94a, 94b of the C-shaped core 94 into the vicinity of the tire 60, generating the strong alternating magnetic field H2 in the space between the tire 60 and the wheel 53. Strong operating power may be supplied to the tire pressure/temperature detection device 80 effectively, and gyros and multiple sensors that will be needed for control of vehicle attitude in the future may be operated, and more information related to the inside of the tire may be provided to the driver.

Ninth Embodiment

In the first to the eighth embodiments the basic structure of the respective reader antennae are solenoid antennae 90, 90-1, 90-2, 90A and 90B, and proposals are made for raising the magnetic force concentrating effect thereof.

In contrast, in the ninth embodiment, while the philosophy of other portions is the same, the reader antenna is a ring shaped antenna 90C, and this is constructed of a single turn loop of one strand of conductive wire. A detailed explanation thereof will be given below.

Configuration of the Ninth Embodiment

Figure 15A:
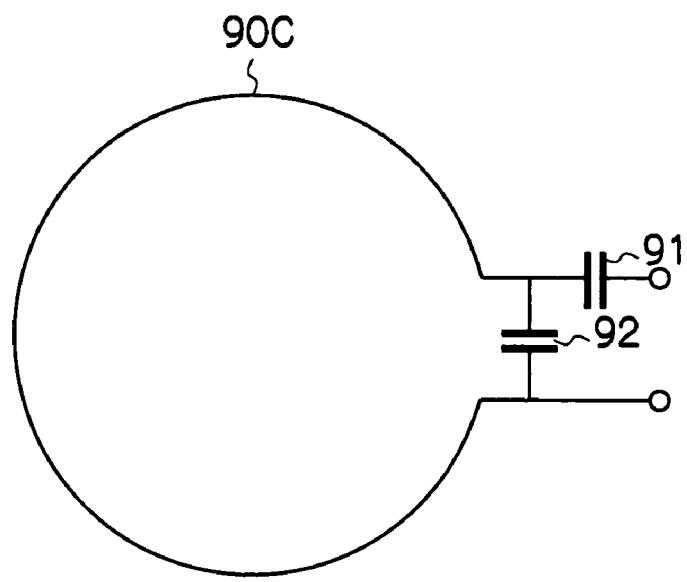
FIG. 15A and FIG. 15B are explanatory diagrams of the main portions of a tire condition detection system of a ninth embodiment of the invention.
Figure 15B:
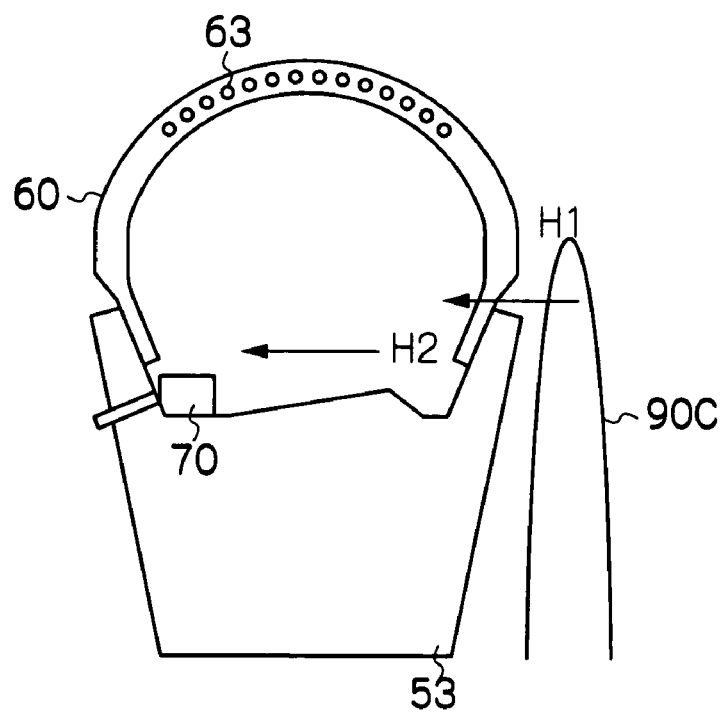

FIGS. 15A and 15B are explanatory diagrams showing the main portions of a tire condition detection system according to the ninth embodiment of the invention. FIG. 15A is an outline plan view of a ring shaped antenna, and FIG. 15B is a cross-sectional diagram of a ring shaped antenna and a tire. Common elements to those of the first embodiment shown in FIGS. 1A and 1B are indicated by the same numerals.

In the ninth embodiment the ring shaped antenna 90C is constructed of a single turn of one strand of conductive wire, having resistance and inductance, therefore in order to receive high frequency power with high efficiency, a matching circuit configured with two matching condensers 91, 92 is necessary.

The ring shaped antenna 90C is made of conductive wire (for example copper) of about 1 mm to about 5 mm diameter (for example, 3 mm diameter), and, is formed so as to match the diameter of the tire 60, being formed into a circular shape with the smallest dimension and the largest dimension of the diameter thereof being several cm or more larger than the smallest diameter of the tire 60, and several cm or more smaller than the largest diameter of the tire 60 (for example having a diameter of about 60 cm). The ring shaped antenna 90C is fixed vertically to the car body at a predetermined separation from the side face of the tire 60 (for example, about 50 mm or less). The structure is such that, due to an alternating magnetic field H1 radiated from the ring shaped antenna 90C, a strong induced current flows in reinforcement material 63 embedded in the tire 60, and because of this an alternating magnetic field H2 is generated in the space between the wheel 53 and the tire 60.

FIG. 15B is a cross-sectional diagram, and the lower half portion of the wheel, while not illustrated, the same as the top half portion of the wheel because of the symmetry but with the valve 70 removed. Furthermore, by the induction phenomenon of the reinforcement material 63 in the tire 60, the alternating magnetic field H2 has a substantially uniform distribution about the axis in the space between the tire 60 and the wheel 53.

Operation of the Ninth Embodiment

In the same way as in the first embodiment, high frequency power is output from the high frequency power source 102, and this is supplied to the ring shaped antenna 90C through the matching circuit of the matching condensers 91, 92. The ring shaped antenna 90C receiving the supplied high frequency power radiates the alternating magnetic field H1 that is substantially parallel to the rotational axis of the tire 60. An induced current flows in the reinforcement material 63 in the rubber portion of the tire 60, and due to this the alternating magnetic field H2 is generated by induction in the space between the tire 60 and the wheel 53.

By induction the alternating magnetic field H2 generates an electromotive force at the two terminals of the solenoid antenna 86 in the valve 70, with the effect that the power necessary for the operation of the tire pressure/temperature detection device 80 is supplied. The detection signals from the air pressure sensor 82 and the temperature sensor 83 are transmitted to the driver via the same route and method as those of the first embodiment.

Effect of the Ninth Embodiment

The ring shaped antenna 90C used in the ninth embodiment is disposed substantially coaxially to the tire 60, and the intensity of the alternating magnetic field H2 in the space between the tire 60 and the wheel 53 is substantially the same for positions with the same distance from the central axis of the tire 60. That is to say, the intensity of the alternating magnetic field H2 in the space between the tire 60 and the wheel 53 is symmetrical about the axis, and extremely stable magnetic energy is supplied to the tire pressure/temperature detection device 80 in the valve 70.

Effectively, when parking, such as with a car, it does not matter which position the valve 70 is in, and a stable power supply from the ring shaped antenna 90C may always be received. This characteristic is one that is not present in the solenoid antennae 90, . . . of the first to the eighth embodiments. Furthermore, the ring shaped antenna 90C and the tire 60 are substantially coaxial and so not so much care is required in the up-down, left-right positioning when fixing to the vehicle body. Therefore, the induction supply method using the ring shaped antenna 90C of the ninth embodiment is the most superior.

If the ring shaped antenna 90C is a substantially circular shaped loop then the same operational effect may be obtained.

Mode of Use of the Ninth Embodiment

The mode of use of the ninth embodiment is the same as that of the first to the eighth embodiments, but since a ring shaped antenna 90C that has the same central axis to that of the central axis of the tire in a ring shape or loop shape is used, stable and also strong high frequency power may be supplied without much relation to the position of the valve 70 moving due to the rotation of the tire 60. Because of this, gyros and multiple sensors that will be needed for control of vehicle attitude in the future may be operated, and more information related to the inside of the tire may be provided to the driver.

MODIFIED EXAMPLES

The present invention is not limited to the illustrated first to ninth embodiments and modes of use, and various modifications may be made. These modifications are, for example, such as those of the following (a) to (c).

(a) In the tire pressure/temperature detection device 80 with antennae 90, . . . accommodated in the valve 70, apart from the air pressure sensor 82 and the temperature sensor 83, other sensors such as those for detecting the pH of the air inside the tire, acceleration and the like may be provided.

(b) The tire pressure/temperature detection device 80 with antennae 90, . . . may be fixed to other locations in the tire other than the valve 70.

(c) In the embodiments tire condition detection systems for fixing to the tire 60 of vehicles was explained but the present invention may be applied to tires of construction machinery, haulage machinery, agricultural machinery, airplanes and the like.

What is claimed is:

1. A tire condition detection system for use with a vehicle having an axle, a wheel coupled to the axle, and a tire mounted on the wheel, the axle having an axle axis and the wheel rotating about a wheel axis, the tire including resilient tire material and conductive reinforcement material that is embedded in and surrounded by the resilient tire material, said tire condition detection system comprising:
   an external solenoid fixed in proximity to the outside of said tire and radiating a primary alternating magnetic field that is substantially perpendicular to a side surface of said tire and that generates a primary induced alternating current in said reinforcement material, said external solenoid being disposed adjacent a side surface of said tire and having an external solenoid axis that is substantially perpendicular to the side surface of said tire;
   a coreless internal solenoid having an internal solenoid axis, said internal solenoid being fixed in an inner space between said wheel and said tire such that said internal solenoid does not circumscribe said wheel axis and said internal solenoid axis is substantially parallel to said wheel axis, said internal solenoid receiving a secondary alternating magnetic field that is generated in the space inside said tire due to said primary induced alternating current generated in said reinforcement material, and outputting a secondary alternating current, said internal solenoid having two ends and having an internal solenoid axis that is substantially parallel to said wheel axis;
   a power source, fixed in said inner space and said tire, electrically connected to said two ends of said internal solenoid and converting said secondary alternating current into direct current power and outputting source power; and
   a detector, fixed in said inner space and said tire and operated by said source power, detecting predetermined conditions inside said tire and transmitting the detected signal to said external solenoid via said internal solenoid and said reinforcement material.

2. The tire condition detection system according to claim 1, wherein said primary alternating magnetic field radiated by said external solenoid is excited by a high frequency power source.

3. A tire condition detection system for use with a vehicle having an axle, a wheel that is coupled to the axle and that is provided with a valve fixed thereto, and a tire mounted on the wheel, the axle having an axle axis and the wheel having a wheel axis, the tire including resilient tire material and conductive reinforcement material that is embedded in and surrounded by the resilient tire material, said tire condition detection system comprising:
   an external solenoid that is fixed in proximity to the outside of said tire, said external solenoid having an external solenoid axis that is substantially parallel to said axle axis and radiating a primary alternating magnetic field that generates a primary induced alternating current in said reinforcement material due to said primary alternating magnetic field;
   an internal solenoid that is fixed at said valve, said internal solenoid having two ends and having an internal solenoid axis that is substantially parallel to said wheel axis, said internal solenoid receiving a secondary alternating magnetic field, generating a secondary induced alternating current, and outputting a secondary induced alternating current, wherein said secondary alternating magnetic filed is generated in a space between said tire and said wheel by said primary induced alternating current flowing in said reinforcement material;
   a power source, fixed at said valve, said power source being electrically connected to said two ends of said internal solenoid and converting said secondary induced alternating current into direct current power and outputting source power; and
   a detector, fixed at said valve, operated by said source power, detecting predetermined conditions inside said tire and transmitting the detected signal to said external solenoid via said internal solenoid and said reinforcement material.

4. The tire condition detection system according to claim 3, wherein said external solenoid comprises a plurality of turns of conductive wire wound in a solenoid shape, and said external solenoid receives high frequency power from a high frequency power source and radiates said primary alternating magnetic field in the direction of said external solenoid axis such that said primary alternating magnetic field at both ends of said external solenoid diverges, and widens out into the surrounding space and a portion of components of said magnetic field passes through a side face of primary alternating said tire substantially perpendicularly.

5. The tire condition detection system according to claim 3, further comprising a bar shaped core, with a main component of soft iron or ferrite, and provided along the external solenoid axis.

6. The tire condition detection system according to claim 3, wherein a C-shaped core is provided with a main component of soft iron or ferrite along said external solenoid axis and a conductive wire of said external solenoid is wound around said C-shaped core, said C-shaped core having two ends that substantially face one another.

7. The tire condition detection system according to claim 3, wherein said primary alternating magnetic field radiated by said external solenoid is excited by a high frequency power source.

8. An induction supply method of a tire condition detection system for use in a vehicle having an axle, a wheel coupled to the axle, and a tire mounted on the wheel, the axle having an axle axis and the wheel rotating about a wheel axis, the tire including resilient tire material and conductive reinforcement material that is embedded in and surrounded by the resilient tire material, said induction supply method comprising:
   radiating a primary alternating magnetic field for power use from an external solenoid that is fixed adjacent the outside of said tire so as to radiate said primary alternating magnetic field substantially perpendicular to a side surface of said tire, said external solenoid having an external solenoid axis that is substantially perpendicular to the side surface of said tire, and said external solenoid additionally receiving a data signal from said tire;
   generating a primary induced alternating current in said reinforcement material via said primary alternating magnetic field, a second alternating magnetic field being generated in a space between said tire and said wheel due to said primary induced alternating current in said reinforcement material;
   receiving said secondary alternating magnetic field with a coreless internal solenoid that has two ends and that is fixed in an inner space between said wheel and said tire, said internal solenoid having an internal solenoid axis that does not circumscribe said wheel axis and that is substantially parallel to said wheel axis, said internal solenoid generating a secondary induced alternating current and transmitting said data signal from said tire via said reinforcement material to said external solenoid; and using said secondary induced alternating current to power an apparatus that is electrically connected to said two ends of said internal solenoid.

9. The induction supply method according to claim 8, wherein said primary alternating magnetic field radiated by said external solenoid is excited by a high frequency power source, a continuous high frequency alternating magnetic field.

10. An induction supply method of a tire condition detection system for use with a vehicle having an axle, a wheel coupled to the axle, and a tire mounted on the wheel, the axle having an axle axis and the wheel rotating about a wheel axis, the tire including resilient tire material and conductive reinforcement material that is embedded in and surrounded by the resilient tire material, said induction supply method comprising:

radiating a primary alternating magnetic field for power use from an external solenoid disposed adjacent the outside of the tire so as to radiate said primary alternating magnetic field substantially perpendicular to a side surface of said tire, and receiving a data signal from said tire, said external solenoid having an external solenoid axis that is substantially perpendicular to the side surface of the tire;

generating a primary induced alternating current in said reinforcement material via said primary alternating magnetic field, a second alternating magnetic field being generated in an inner space between said tire and said wheel due to said primary induced alternating current in said reinforcement material;

receiving said secondary alternating magnetic field with a coreless internal solenoid that is fixed in said inner space and that has two ends, said internal solenoid having an internal solenoid axis that does not circumscribe said wheel axis and that is substantially parallel to said wheel axis, said internal solenoid generating a secondary induced alternating current for power use and transmitting said data signal from said tire via said reinforcement material to said external solenoid; and detecting at least one predetermined condition inside said tire with an apparatus that is electrically connected to said two ends of said internal solenoid and that is operated by said secondary induced alternating current, and transmitting a detected signal to said external solenoid via said internal solenoid and said reinforcement material.

11. The induction supply method according to claim 10, wherein said-primary alternating magnetic field radiated by said external solenoid is excited by a high frequency power source, a continuous high frequency alternating magnetic field.

12. An induction supply method of a tire condition detection system for use with a vehicle having an axle, a wheel coupled to the axle, and a wheel with a valve fixed thereto, the axle having an axle axis and the wheel rotating about a wheel axis, the tire including resilient tire material and conductive reinforcement material that is embedded in and surrounded by the resilient tire material, said induction supply method comprising:

radiating a primary alternating magnetic field for power use from an external solenoid that is fixed adjacent the outside of said tire, said external solenoid having an external solenoid axis that is substantially parallel to said axle axis and receiving a data signal from said tire;

generating a primary induced alternating current in said reinforcement material via said primary alternating magnetic field, a second alternating magnetic field being generated in an inner space between said tire and said wheel due to said primary induced alternating current in said reinforcement material;

receiving said secondary alternating magnetic field with an internal solenoid that is fixed at said valve, said internal solenoid generating a secondary induced alternating current and transmitting said data signal from said tire via said reinforcement material to said external solenoid, said internal solenoid having two ends and having an internal solenoid axis that is substantially parallel to said wheel axis;

detecting at least one predetermined condition inside said tire with an apparatus that is electrically connected to said two ends of said internal solenoid and that is operated by said secondary induced alternating current, and transmitting a detected signal to said external solenoid via said internal solenoid and said reinforcement material.

13. The induction supply method according to claim 12, wherein said external solenoid comprises a plurality of turns of conductive wire with an insulating coating wound in a solenoid shape, and said external solenoid receives an alternating current from a high frequency power source.

14. The induction supply method according to claim 13, wherein said external solenoid is a first external solenoid, and further comprising a second external solenoid, with said first and second external solenoids being positioned at substantially 90° or more to each other on the circumference of a circle with said wheel axis at the center, and wherein power generated by said secondary alternating magnetic field of both said first and second external solenoids is supplied to said detector.

15. The induction supply method according to claim 14, wherein said first and second external solenoids are disposed at positions substantially on opposite sides of a circle with said wheel axis at the center.

16. The induction supply method according to claim 12, wherein said primary alternating magnetic field radiated by said external solenoid is excited by a high frequency power source, a continuous high frequency alternating magnetic field.

17. An inductively powered tire condition detection system comprising:

a tire internally provided with conductive reinforcement material, and mounted on a wheel with a valve fixed thereto;

two external solenoids each comprising a plurality of turns of conductive wire with an insulating coating wound in a solenoid shape are positioned in the same direction to the rotational axis of said tire, wherein said two external solenoids are disposed one on each side of said tire such that they have the same central axes as each other, and the directions of flow of alternating currents in said external solenoids are adjusted such that the direction of alternating magnetic fields radiated by said respective external solenoids are the same, and as a primary alternating magnetic field is generated when power is supplied from a high frequency power source, said two external solenoids generate a primary induced alternating current in said reinforcement material via said primary alternating magnetic field radiating at the side surface of said tire substantially perpendicularly;

an internal solenoid fixed at said valve, receiving a secondary alternating magnetic field, that is generated in the space between said tire and said wheel due to said primary induced alternating current, at the cross section of said internal solenoid substantially perpendicularly, and generating a secondary induced alternating current;

a power source, fixed at the valve, converting said secondary induced alternating current into direct current power and outputting source power; and a detector, fixed at the valve, operated by said source power, detecting predetermined conditions inside said tire and transmitting the detected signal to said external solenoids via said internal solenoid and said reinforcement material.

18. An inductively powered tire condition detection system comprising:

a tire, internally provided with a conductive reinforcement material, and mounted on a wheel with a valve fixed thereto;

an external solenoid, wound with a plurality of turns, with an extended dimension in the lateral direction, curved in the lateral direction an arc shape around the outer peripheral surface of said tire is disposed either directly above the outer peripheral surface of said tire or at an angle to that position, so that the central axis of said external solenoid is substantially parallel to the axis of rotation of said tire, wherein, as a primary alternating magnetic field is generated when power is supplied from a high frequency power source, said external solenoid generates a primary induced alternating current in said reinforcement material via said primary alternating magnetic field radiating at the side surface of said tire substantially perpendicularly;

an internal solenoid, fixed at said valve, receiving a secondary alternating magnetic field, that is generated in the space between said tire and said wheel due to said primary induced alternating current, at the cross section of said internal solenoid substantially perpendicularly, and generating a secondary induced alternating current;

a power source, fixed at the valve, converting said secondary induced alternating current into direct current power and outputting source power; and a detector, fixed at the valve, operated by said source power, detecting predetermined conditions inside said tire and transmitting the detected signal to said external solenoids via said internal solenoid and said reinforcement material.

19. The inductively powered tire condition detection system according to claim 18, wherein said external antenna is formed of a solenoid shape using tape-shaped conductive foil.

20. An inductively powered tire condition detection system comprising:

a tire, internally provided with a conductive reinforcement material, and mounted on a wheel with a valve fixed thereto;

an external solenoid that is curved in the central axis direction such that the two ends of said solenoid approach the two side faces of said tire, and said solenoid is disposed with substantially left-right symmetry to said tire, wherein as a primary alternating magnetic field is generated when power is supplied from a high frequency power source, said external solenoid generates a primary induced alternating current in said reinforcement material via a component of said primary alternating magnetic field radiating at the side surface of said tire;

an internal solenoid, fixed at said valve, receiving a secondary alternating magnetic field, that is generated in the space between said tire and said wheel due to said primary induced alternating current, at the cross section of said internal solenoid substantially perpendicularly, and generating a secondary induced alternating current;

a power source, fixed at the valve, converting said secondary induced alternating current into direct current power and outputting source power; and a detector, fixed at the valve, operated by said source power detecting predetermined conditions inside said tire and transmitting the detected signal to said external solenoids via said internal solenoid and said reinforcement material.

21. An inductively powered tire condition detection system comprising:

a tire internally provided with conductive reinforcement material, and mounted on a wheel with a valve fixed thereto;

an external solenoid that is formed in a loop shape with one turn of conductive wire, said external solenoid having a central axis that is substantially the same as the rotational axis of said tire, and being disposed at a predetermined position from a side of said tire, wherein said external solenoid receives high frequency power from a high frequency power source and a primary alternating magnetic field vortex is generated around said conductive wire of said external solenoid, and a primary induced alternating current is generated in said reinforcement material via said primary alternating magnetic field radiating at the side surface of said tire substantially perpendicularly;

an internal solenoid, fixed at said valve, receiving a secondary alternating magnetic field, that is generated in the space between said tire and said wheel due to said primary induced alternating current, at the cross section of said internal solenoid substantially perpendicularly and generating a secondary induced alternating current;

a power source, fixed at the valve, converting said secondary induced alternating current into direct current power and outputting source power; and a detector, fixed at the valve, operated by said source power, detecting predetermined conditions inside said tire and transmitting the detected signal to said external solenoids via said internal solenoid and said reinforcement material.

* * * * *